United States Patent
Liu et al.

(10) Patent No.: US 11,727,926 B1
(45) Date of Patent: Aug. 15, 2023

(54) SYSTEMS AND METHODS FOR NOISE REDUCTION

(71) Applicant: Amazon Technologies, Inc., Seattle, WA (US)

(72) Inventors: Yuzhou Liu, Mountain View, CA (US); Savaskan Bulek, Sunnyvale, CA (US); Ali Abdollahzadeh Milani, Mountain View, CA (US); Tarun Pruthi, Fremont, CA (US); Trausti Thor Kristjansson, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 379 days.

(21) Appl. No.: 17/025,376

(22) Filed: Sep. 18, 2020

(51) Int. Cl.
| | | |
|---|---|---|
| G10L 15/20 | (2006.01) | |
| G10L 15/22 | (2006.01) | |
| G10L 15/16 | (2006.01) | |
| G10L 25/84 | (2013.01) | |
| G10L 25/90 | (2013.01) | |
| G10L 21/0232 | (2013.01) | |
| G06N 3/044 | (2023.01) | |
| G06N 3/045 | (2023.01) | |

(52) U.S. Cl.
CPC .............. *G10L 15/20* (2013.01); *G06N 3/044* (2023.01); *G06N 3/045* (2023.01); *G10L 15/16* (2013.01); *G10L 15/22* (2013.01); *G10L 21/0232* (2013.01); *G10L 25/84* (2013.01); *G10L 25/90* (2013.01)

(58) Field of Classification Search
CPC ......... G10L 15/20; G10L 15/16; G10L 15/22; G10L 21/0232; G10L 25/84; G10L 25/90; G06N 3/0445; G06N 3/0454
See application file for complete search history.

(56) References Cited

U.S. PATENT DOCUMENTS

| | | | |
|---|---|---|---|
| 11,341,983 B2* | 5/2022 | Nandi | G10L 25/84 |
| 11,594,310 B1* | 2/2023 | Bradley | G06F 17/11 |
| 2012/0243702 A1* | 9/2012 | Sandgren | G10L 21/0208 381/73.1 |
| 2012/0243706 A1* | 9/2012 | Sandgren | G10L 25/24 381/98 |
| 2017/0180558 A1* | 6/2017 | Li | H04M 3/568 |
| 2018/0166077 A1* | 6/2018 | Yamaguchi | G06F 16/634 |
| 2019/0180743 A1* | 6/2019 | Yoshida | G10L 15/02 |
| 2020/0090676 A1* | 3/2020 | Nandi | G10L 21/0264 |
| 2020/0184987 A1* | 6/2020 | Kupryjanow | G10L 15/16 |
| 2021/0012767 A1* | 1/2021 | Kupryjanow | G10L 21/0208 |
| 2021/0319625 A1* | 10/2021 | Goodrich | G06T 5/005 |
| 2021/0360349 A1* | 11/2021 | Nyayate | H04R 3/04 |
| 2022/0343896 A1* | 10/2022 | Tagliasacchi | G10L 25/12 |

* cited by examiner

Primary Examiner — Akwasi M Sarpong
(74) Attorney, Agent, or Firm — Pierce Atwood LLP

(57) ABSTRACT

A computing device may receive audio data from a microphone representing audio in an environment of the device, which may correspond to an utterance and noise. A model may be trained to process the audio data to reduce noise from the audio data. The model may include an encoder that includes one or more dense layers, one or more recurrent layers, and a decoder that includes one or more dense layers.

18 Claims, 16 Drawing Sheets

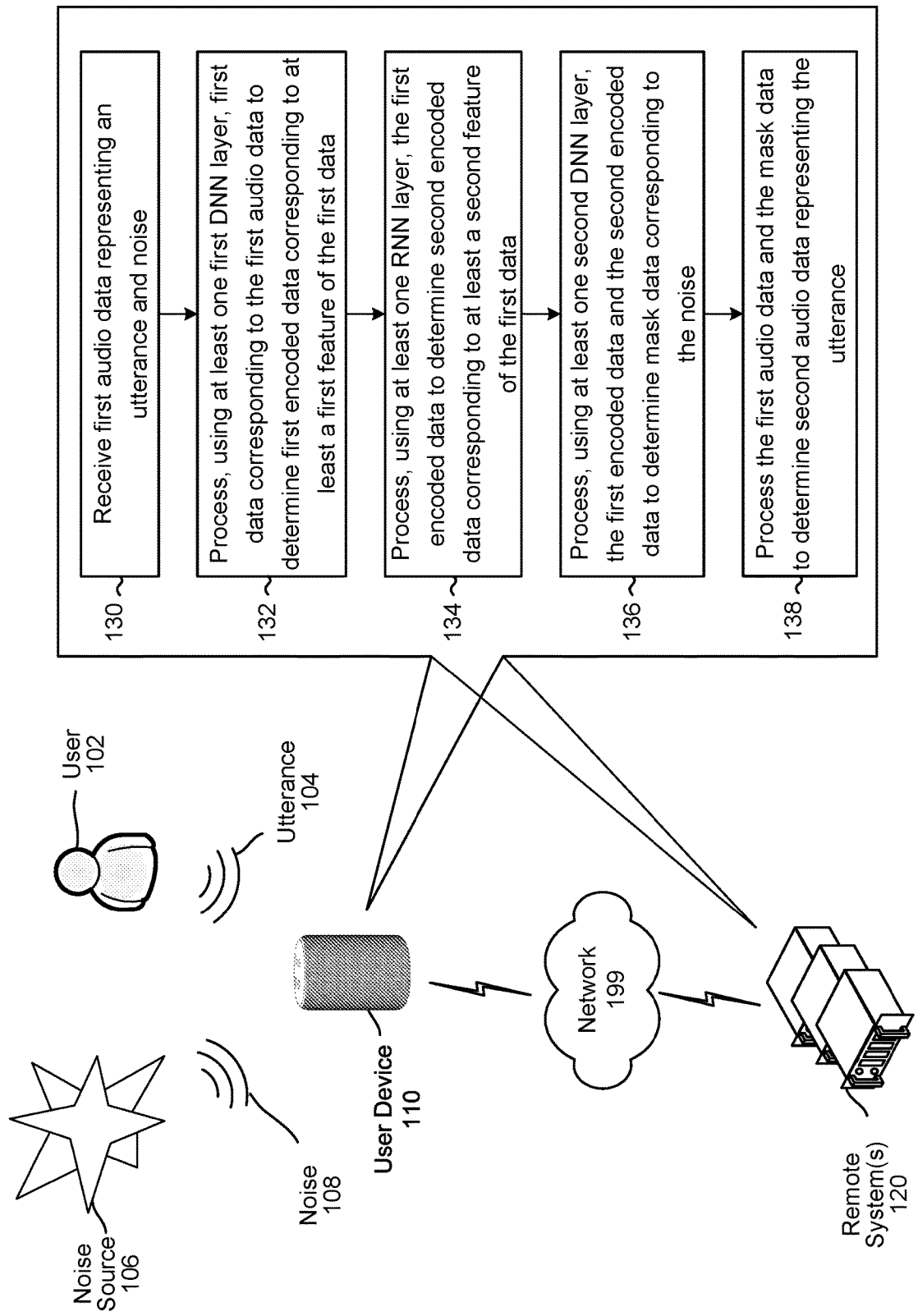

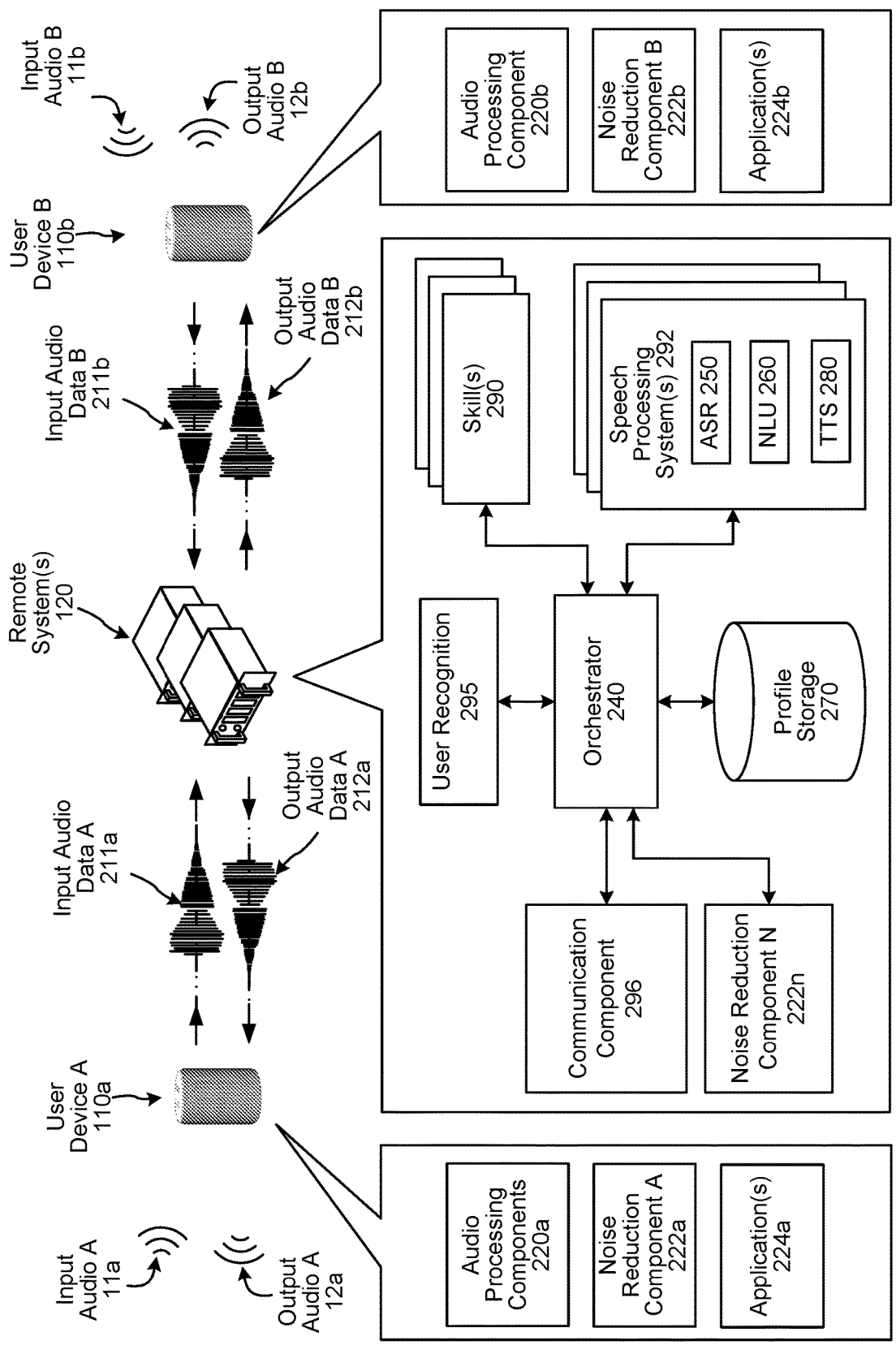

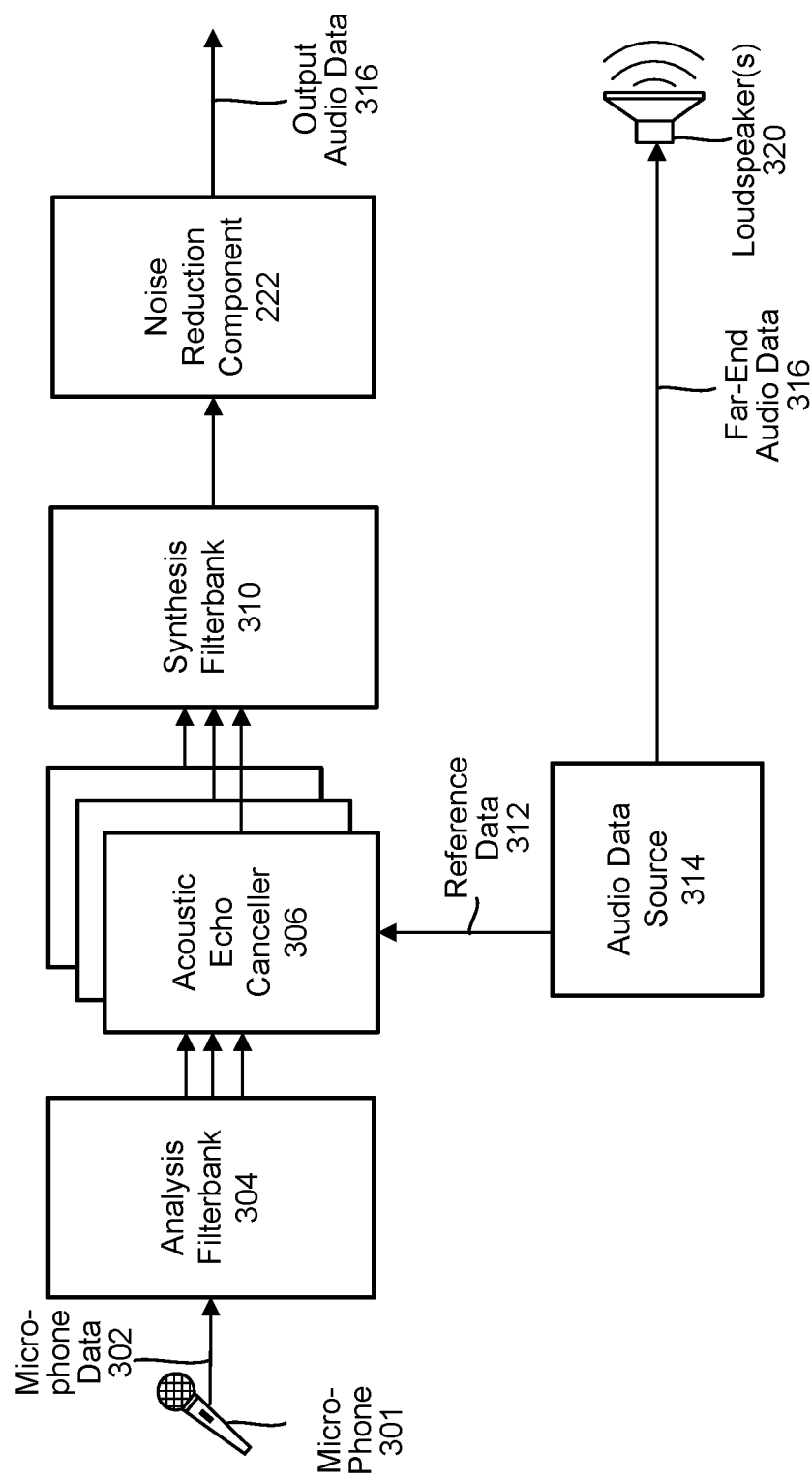

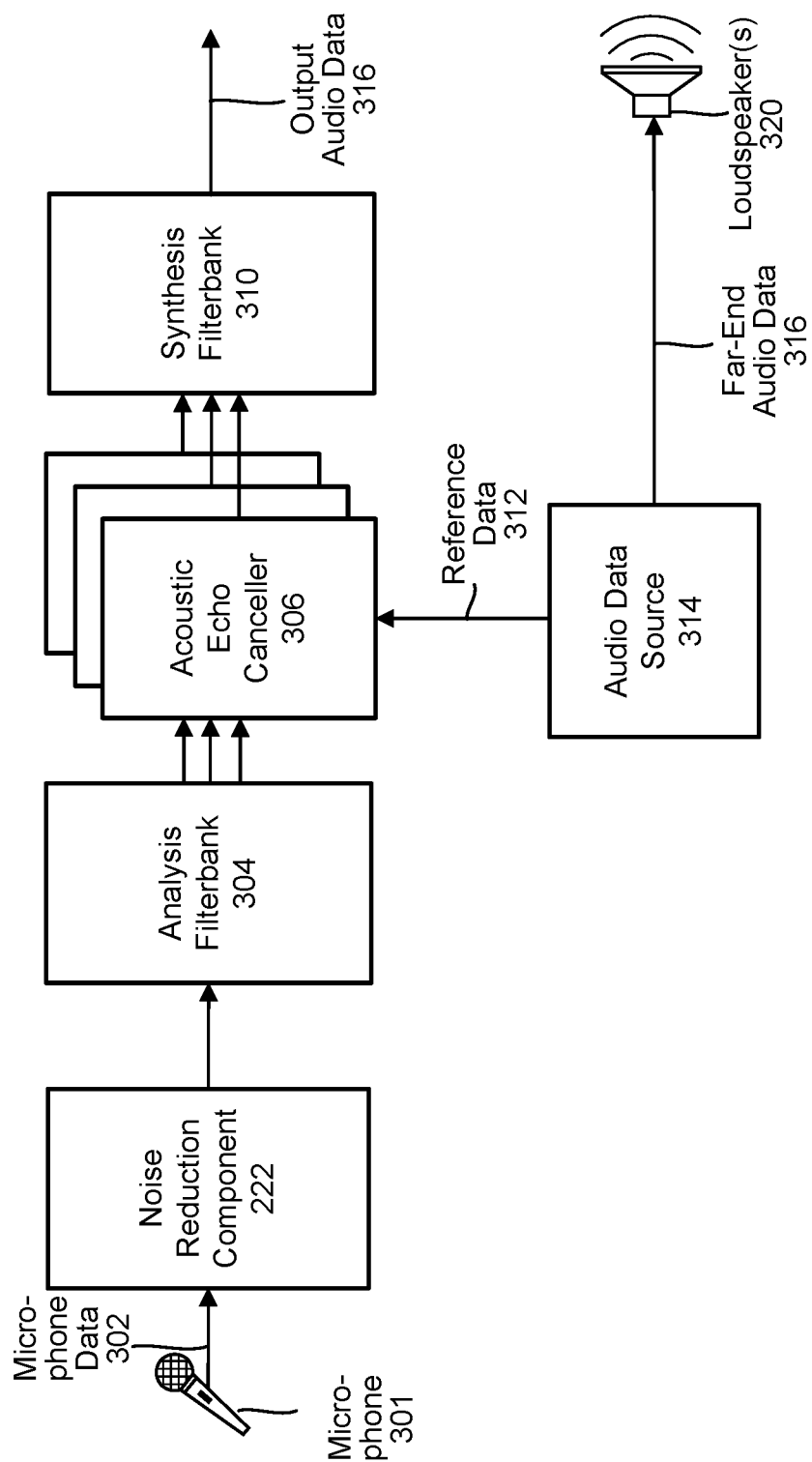

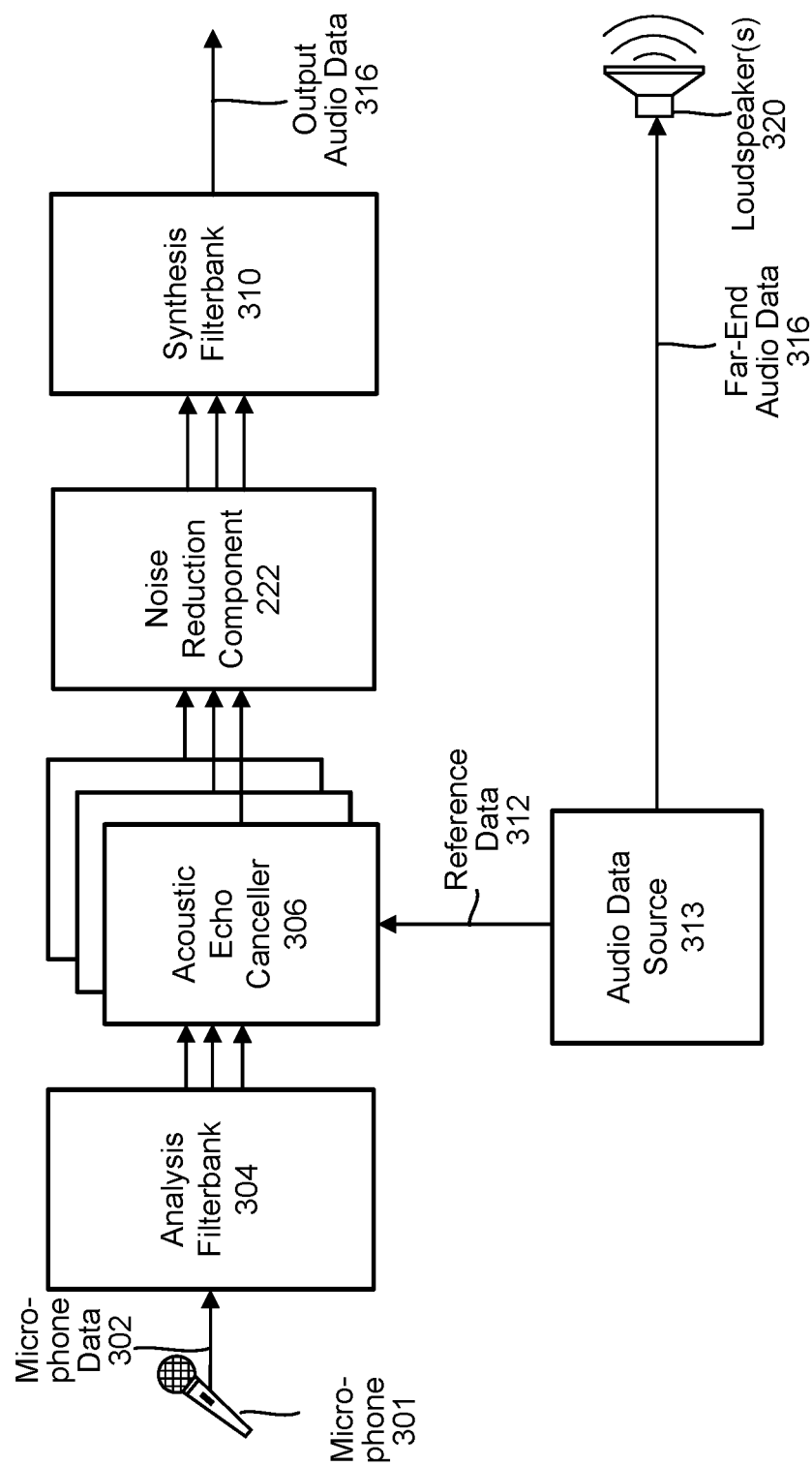

SYSTEMS AND METHODS FOR NOISE REDUCTION

BACKGROUND

A computing device may include at least one microphone for capturing audio, which may include a representation of an utterance and of noise, present in an environment of the computing device. Techniques may be used to process corresponding audio data received from the microphone to reduce the noise represented in the audio data. The device may cause further processing to be performed on the processed audio data.

BRIEF DESCRIPTION OF DRAWINGS

For a more complete understanding of the present disclosure, reference is now made to the following description taken in conjunction with the accompanying drawings.

FIG. 1 illustrates a system and method for noise reduction according to embodiments of the present disclosure.

FIG. 2 illustrates a computing environment including noise reduction components according to embodiments of the present disclosure.

FIGS. 3A, 3B, and 3C illustrate components for audio processing with noise reduction according to embodiments of the present disclosure.

DETAILED DESCRIPTION

Figure 4A:
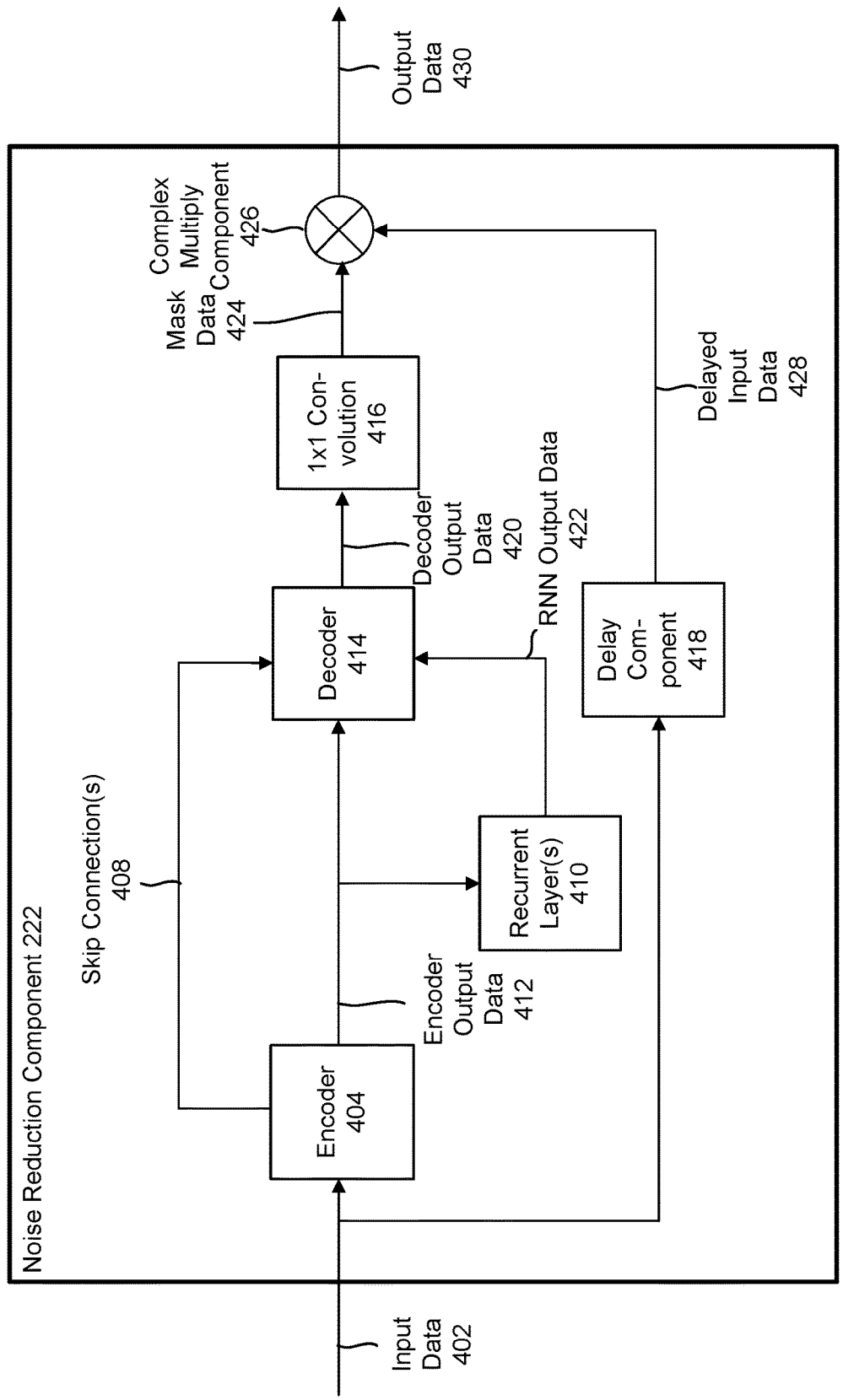
FIGS. 4A and 4B illustrate components for noise reduction according to embodiments of the present disclosure.

A computing device such as a smart speaker, smartphone, laptop computer, or desktop computer may receive audio and process corresponding audio data that may include a representation of an utterance and of noise. The utterance may include speech and/or non-speech sounds. The device may include, among other components, one or more microphones that are capable of sensing audio present in an environment of the device and transforming that audio into the audio data. The device may process the audio data, as described herein, and then cause further processing to be performed on the processed audio data by one or more other devices. This further processing may include outputting the audio data by a second device (as part of, for example, two-way audio and/or video communications) and/or performing automatic speech recognition and/or natural language understanding processing using the audio data.

Presence of the representation of the noise in the audio data may, however, degrade a user experience with respect to using the device. A participant in audio and/or video communications with the user may be unable to comprehend some or all of the utterance of the user if portions of the representations of the utterance coincide with representations of the noise. Automatic speech recognition techniques may be unable to accurately determine text data corresponding to the utterance if, similarly, portions of the representations of the utterance coincide with representations of the noise. Reduction of the representation of the noise in the audio data may therefore improve the user experience.

Noise may be generated by other objects or persons present in the environment of the device and/or by the device itself. Certain types of noise may be referred to as "static" or stationary noise; these types of noise may be invariant with respect to their amplitude and/or frequency over time and/or may vary over time with a fixed period. These types of noise may be generated by, for example, an electric motor or electric fan. Other types of noise, however, may change over time; these types of noise may be referred to as "dynamic" or non-stationary noise. Examples of sources of these types of noise may include a door slamming or a car horn honking.

In various embodiments of the present disclosure, a noise-reduction component, which may include a trained model, processes audio data received from at least one microphone and/or other source and reduces noise in the audio data to generate processed audio data that represents the utterance but that does not include the original representation of the noise. The noise-reduction component may include an encoder that processes the audio data to determine one or more high-level features of the audio data, such as tone, pitch, and/or speech rate, as represented by first encoded data. The noise-reduction component may further include one or more recurrent layers, such as gated recurrent unit (GRU) layers and/or long short-term memory (LSTM) layers, that process the first encoded data to determine second encoded data. The second encoded data may correspond to a number of items of first encoded data received over a period of time, such as 5-10 seconds or, in some embodiments, 6-8 seconds. This period of time may correspond to the duration of time of an average utterance. The noise-reduction component may further include a decoder for processing the first encoded data and the second encoded data to determine mask data. The audio data may then be processed using this mask data to determine output data representing the utterance and reduced noise.

FIG. 1 illustrates a system that includes a user device 110, which is described in greater detail below, disposed in an environment. As explained herein, the environment may include one or more users 102 and corresponding utterance(s) 104 and one or more noise sources 106, which may produce noise 108. The noise may be static or dynamic. Example noise sources 106 include heating/cooling systems, a door slamming, sounds from a pet, whirring of an electric fan, sound output from a stereo or television, automobile traffic sounds such as a honking horn, or other such sounds. The device 110 may capture audio that represents both desired audio, such as the utterance 104, and undesired audio, such as the noise 108. Presence of the noise in the captured audio may deleteriously affect the operation of other functions of the device 110 or other system, such as wakeword detection, automatic speech recognition, and/or audio/video communications.

Figure 8:
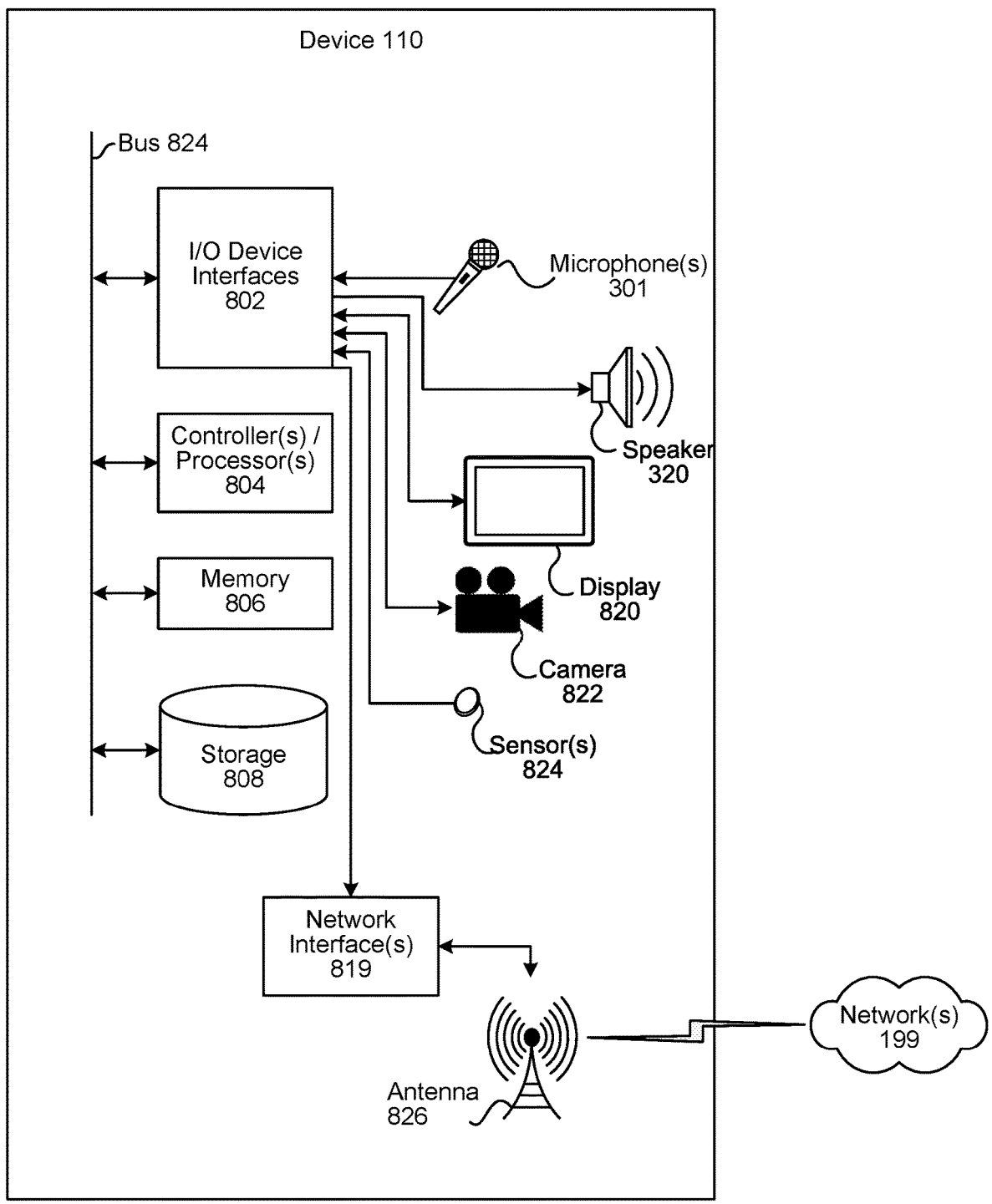
FIG. 8 illustrates a block diagram of a user device according to embodiments of the present disclosure.

The device 110 may contain a noise-reduction component and a number of other components, as described in greater detail herein. For example, the device 110 may include one or more display screens for displaying information to the user 102 and/or receiving touch input from a user. The device 110 may include a loudspeaker to output audio to the user 102, such as audio related to a command or audio related to a request. The device 110 may further include one or more sensors; these sensors may include, but are not limited to, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces, as shown in FIG. 8. The disclosure is not, however, limited to only these components, and the device 110 may include additional components without departing from the disclosure.

In various embodiments, with reference to FIG. 1, the user device 110 and/or remote system 120 receives (120) first audio data that includes representations of both an utterance 104 of a user 102 and noise 108 from a noise source 106. The user device 110 may include a microphone that receives audio including the utterance 104 and/or noise 108 and determines corresponding audio data. The microphone may be or include, for example, a piezoelectric component or a membrane that senses vibrations in the air proximate the microphone and transduces those vibrations into a corresponding electric signal. The device 110 may further include circuitry to process the signal transduced by the microphone, such as an amplifier and/or analog-to-digital converter. In some embodiments, the user device 110 sends the corresponding audio data to the remote system 120, which receives the first audio data including the representations of the utterance 104 and the noise 108.

As described herein, the user device 110 and/or remote system 120 may further process the audio data to, for example, convert time-domain audio data into frequency-domain audio data (via, for example, a Fourier transform), divide the frequency-domain audio data into two or more frequency bins, divide the audio data into segments of time or "frames" of audio data, and/or process frequency-domain audio data to determine magnitude data (which may be magnitude spectrogram data) representing the magnitude of an audio signal and to determine phase audio data (which may be phase spectrogram data) representing the phase of an audio signal. The user device 110 and/or remote system 120 may further process the audio data to remove echoes, such as by using an acoustic echo canceller 306, as shown in FIGS. 3A, 3B, and 3C, and/or perform other audio processing.

The user device 110 and/or remote system 120 may include a noise-reduction component that includes a first component configured as a deep neural-network (DNN) encoder, a second component that includes at least one recurrent neural network (RNN) layer, and a third component configured as a DNN decoder. The encoder may be used to process frames of audio data to extract high-level features corresponding to one or more frames; these high-level features may represent, for example, the tone, pitch, speech rate, inflection, and/or accent of words represented in the audio data. The second component may be used to store or "remember" a number of seconds of previously received audio data, such as 5-10 or 6-8 seconds of audio data, which may represent an average duration of time of an utterance. The decoder may be used to process one or more outputs of the second component to determine mask data used to estimate output audio data that includes a representation of an utterance present in the input audio data. As shown in greater detail in FIGS. 4A and 4B, the user device 110 and/or remote system 120 may further include a complex multiplication component that processes the mask data and the input data to determine the output data.

Figure 5A:
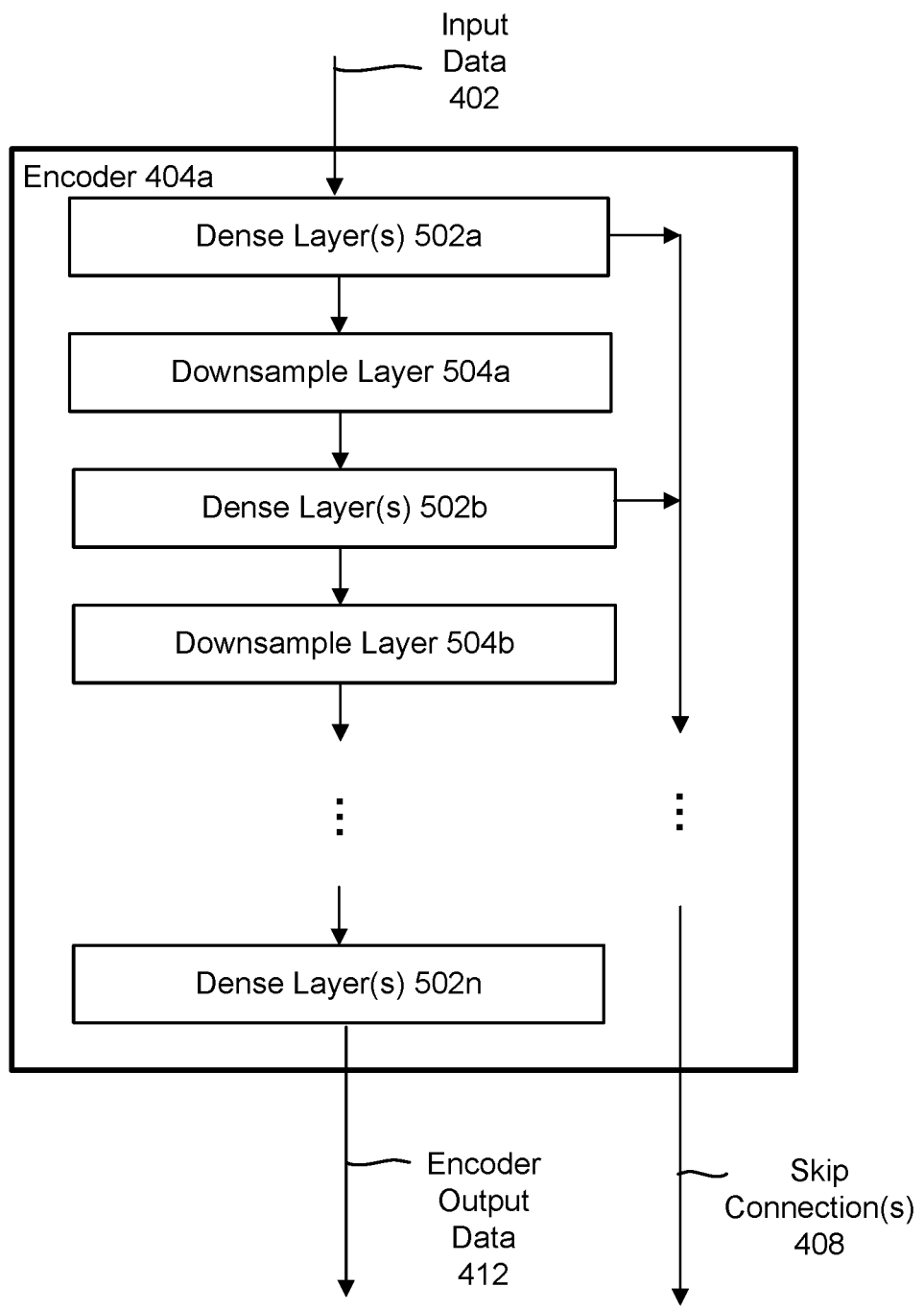
FIGS. 5A and 5B illustrate encoders of a noise-reduction component according to embodiments of the present disclosure.
Figure 5B:
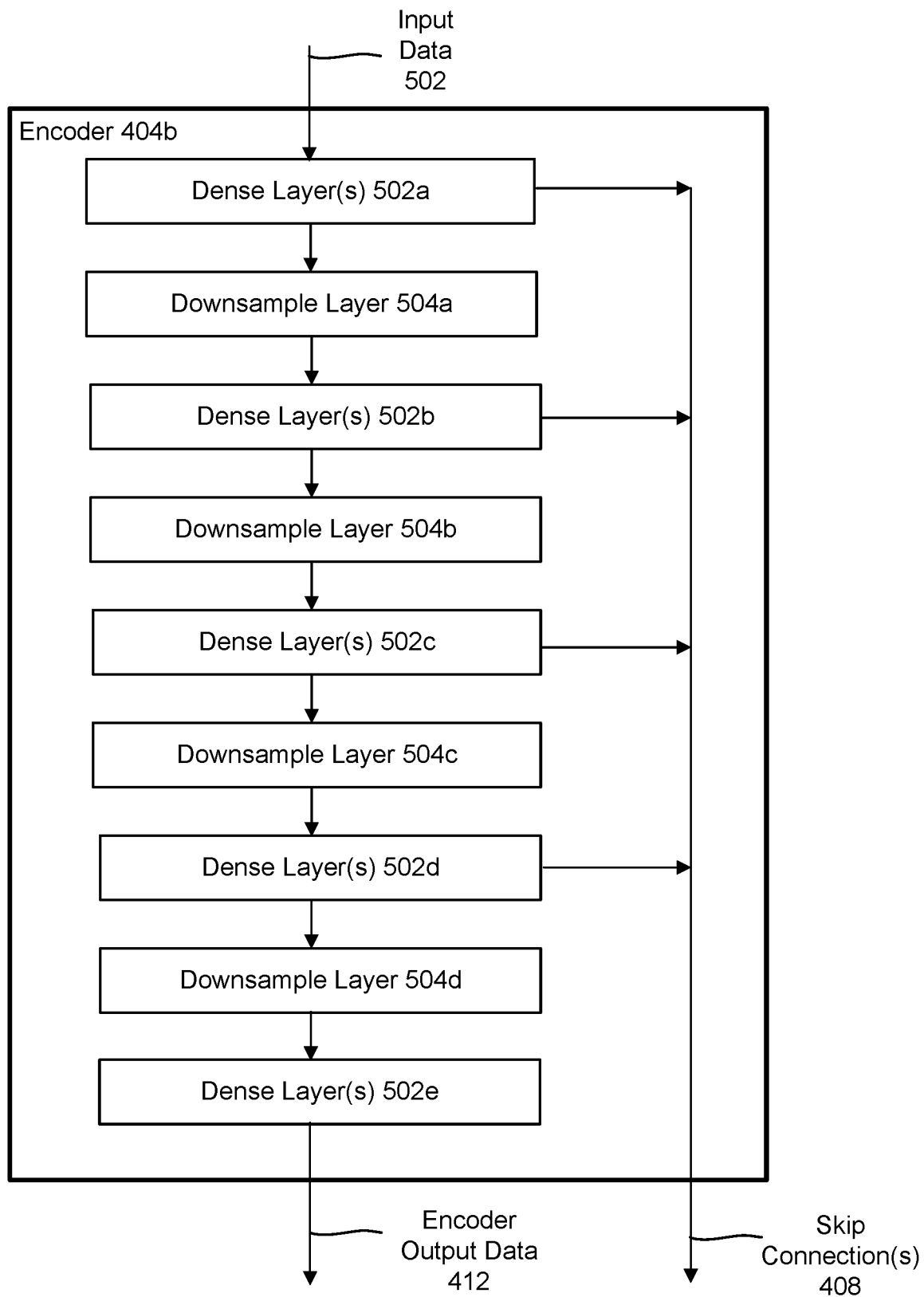

The user device 110 and/or remote system 120 may process (122) the audio data using a first component, which may include at least one deep neural network (DNN) layer that may perform at least one convolution operation on the frequency-domain audio data. Examples of such encoders are shown in FIGS. 5A and 5B. The convolution operation may be a function that processes a number of subsets of each item of frequency-domain audio data (e.g., each frame of data) in accordance with a function, such as a kernel function. For example, the kernel function may be an N×N matrix that selects a number of adjacent items of frequency-domain audio data and applies an operation, such as a sum or average operation, to the selected items. Subsequent numbers of adjacent items may be selected in accordance with a step size, in which the N×N matrix moves through the frequency-domain audio data by the step size.

The encoder and/or decoder (described below) may be "causal" networks, in which an output may be produced for each item of input as the input is received. A causal network may also be described as a real-time network. In contrast, a non-causal network may produce an output only after a certain number of inputs have been received; until the certain number of inputs are received, the non-causal network may not produce an output. For example, a non-causal network configured for natural-language understanding may receive text input such as "What is the weather forecast for tomorrow?" This non-causal network may produce an output, such as "Sunny," only when the last word of the text input ("tomorrow") is received and may not produce an output after other items of input ("what," "is," etc.) are received. A non-causal network may include one or more bi-directional layers that process the input data both from beginning to end and from end to beginning. A causal network, such as the encoder or decoder described herein, may not include bi-directional (or other RNN) layers. In various embodiments, the encoder and/or decoder includes CNN layers and other feedforward layers, such as pooling layers and/or fully-connected layers. Use of a non-causal network in certain applications, such as audio and/or visual communication, may introduce a delay perceptible to a user 102.

The device may process (124), using a second component comprising at least one recurrent neural network (RNN) layer, the first encoded data to determine second encoded data corresponding to at least a second feature of the audio data. The RNN layer(s) may include one or more RNN cells that receive an input that includes a portion of an output of that same cell and/or an output of a cell in a subsequent layer. The RNN layer(s) thus include at least one connection between cells defining a feedback loop, thus permitting the RNN layer(s) to retain information received from previously received input data. The RNN layer(s) may include, for example, one or more long short-term memory (LSTM) cells, one or more gated recurrent unit (GRU) cells, or any other type of recurrent cell. In various embodiments, the RNN layer(s) is/are configured to retain information corresponding to 5-10 or 6-8 seconds of previously received audio data, which may correspond to the average duration of time of an utterance.

The device may process (126), using a third component comprising at least one second DNN layer, the second encoded data to determine mask data corresponding to the noise. The third component may be a decoder, such as the decoders illustrated in FIGS. 6A and 6B. Like the encoder, the decoder may be a causal network that produces an output for each item of input data (e.g., the second encoded data) received. The device may then process (128) the audio data and the mask data (using, for example, a complex multiplication component) to determine second audio data representing the utterance.

The components of the noise-reduction component may be trained to process received audio data that includes a representation of both an utterance and of noise to determine output audio data that includes a representation of the utterance and reduced noise. As the term is used herein, noise reduction refers to reducing a magnitude of the volume of the representation of the noise represented in the audio data. This reduction in magnitude includes reducing the magnitude to zero. Training may include processing, using the noise-reduction component, items of input training data and then modifying the noise-reduction component to produce desired target outputs.

The input training data may include, for example, audio data that includes a representation of an utterance and noise, and the target output may include, for example, audio data that includes a representation of the utterance but not the noise. The training data may be generated by, for example, generating audio data that includes only the utterance and then adding a representation of the noise to a copy of that audio data. The training data may include many examples of inputs and targets; the different examples may include, for example, different utterances, different speakers, different noise sources, and/or different environments. The training data may further include examples of static and dynamic noise. The present disclosure is not limited to any particular type or number of items of training data.

The noise-reduction component may be configured during training to produce a desired target given a corresponding item of input training data by, for example, evaluating its actual output against the desired output. This evaluation may be performed by a comparison function, such as a loss function. If the actual output of the noise-reduction component differs from that of the target output, the noise-reduction component may be re-configured to produce a different output. For example, the DNN and/or LSTM layers may be associated with different configuration values, such as a weight value and/or offset value, that may be re-configured. One or more new values may be determined using a re-configuration algorithm, such as a gradient descent algorithm. The training process may be repeated (e.g., the loss function may be recomputed and the gradient descent algorithm re-run) until a desired accuracy is achieved (e.g., the output of the loss function is less than a desired threshold).

The system may operate using various components as illustrated in FIG. 2. The various components may be located on same or different physical devices. For example, a first noise-reduction component A 220a may be disposed on a first user device 110a, a second noise-reduction component B 220b may be disposed on a second user device 110b, and/or a third noise-reduction component N 222n may be disposed on a remote system 120. Similarly, other components may be disposed on the user devices 110a/110b, while other components may be disposed on the remote system 120. Communication between various components may occur directly (via, e.g., a bus connection) or across a network(s) 199.

An audio capture component(s), such as a microphone or array of microphones of the user devices 110a/110b, captures input audio A/B 11a/11b and creates corresponding input audio data A/B 211a/221b. Each of the user device 110a/110b may process the input audio using various components described herein, such as the noise-reduction components 222a/222b, in creating the input audio data AB 212a/212b. In other embodiments, the remote system 120 may instead or in addition process the input audio data with the noise-reduction component 222n.

During audio and/or video communications, the remote system 120 may receive input audio data A 211a from a first user device 110a, may process the data, and may send corresponding output audio data B 212b to a second user device 110b for output thereon (e.g., as part of audio and/or video communications). In some embodiments, the first user device 110a may send the input audio data A 211a directly to the second user device 110b for output thereon. Similarly, the remote system 120 may receive input audio data B 211b from a second user device 110b, may process the data, and may send corresponding output audio data A 212a to the first user device 110a for output thereon. In some embodiments, the second user device 110b may send the input audio data B 211b directly to the first user device 110a for output thereon.

The user devices 110a/110b may include applications 224a/224b, which may include a communications application for sending the audio data received at a first user device 110a/110b to the other of the user devices 110a/110b (via, in some embodiments, the remote system 120). The remote system 120 may similarly contain a communications component 296 for establishing the audio and/or video communication and/or for sending and receiving the audio data. The remote system 120 may, for example, receive a request from the user device 110a that corresponds to establishing communications with the second user device 110b. The communication component 296 may determine that the request corresponds to the second user device 110b and may determine information identifying the second user device 110a, such as a corresponding network address. In some embodiments, the request corresponds to an utterance, and other components of the remote system 120 (such as an ASR and/or NLU component) may process the request. The communication component 296 may send the identifying information to the first user device 110a and/or may use the identifying information to send audio data to the second user device 110b.

As described above, the remote device 120 may also include the noise-reduction component 222n. In some embodiments, the communication component 296 sends an indication of this inclusion to the user device 110. The user device 110 may thus send, to the remote device 120, an indication that the user device similarly includes the noise-reduction component 222a and/or a portion thereof. Upon receipt, the remote system 120 may determine not to further process the audio data with its own noise-reduction component 222n (to, e.g., avoid redundantly processing the audio data with two noise-reduction components 222a, 222n).

In addition to audio and/or video communication, the user devices 110a/110b may perform other processing using the audio data. The user devices 110a/110b may, for example, include a wakeword detector for detecting one or more wakewords and/or a voice-activity detector for detecting an utterance. The wakeword detector may be disposed on the user devices 110a/110b, while further speech-processing components (such as a NLU component 260) are disposed on the remote system 120. The present disclosure is not, however, limited to only this arrangement of components, and any other disposition of components is within the embodiments of the present disclosure. For example, some or all of the speech processing may be performed by the user device 110, and the user device 110 may thus not send any audio data 211 to the remote system 120.

The wakeword detector of the user device 110 may process the input audio data 211 to determine whether speech is represented therein. The user device 110 may use various techniques to determine whether the input audio data 211 includes speech. In some examples, the voice-activity detector of the user device 110 may apply voice-activity detection (VAD) techniques. Such VAD techniques may determine whether speech is present in audio data based on various quantitative aspects of the input audio data 211, such as the spectral slope between one or more frames of the audio data; the energy levels of the audio data in one or more spectral bands; the signal-to-noise ratios of the audio data in one or more spectral bands; or other quantitative aspects. In other examples, the user device 110 may include a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector may determine that the input audio data 211 contains a representation of a wakeword (as described in greater detail below); the user device 110 may thereafter send the input audio data 211 to the system(s) 120. An example wakeword is "Alexa." The user device 110 may instead or in addition send the audio data to the system(s) 120 when an input detector detects an input—such as a key press, button press, or touch-screen touch. An example button is a "Push to Talk" button. In either event, the user device 110 may send the input audio data 211 to the server 120.

The wakeword detector may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector may be built on deep neural network (DNN)/recursive neural network (RNN) structures directly, without HAIM being involved. Such an architecture may estimate the posteriors of wakewords with context information, either by stacking frames within a con¬text window for DNN, or using RNN. Follow-on posterior threshold tuning or smoothing is applied for decision making. Other techniques for wakeword detection, such as those known in the art, may also be used.

After the wakeword is detected by the wakeword detector and/or input is detected by the input detector, the user device 110 may transmit the audio data 211 to the remote system(s) 120. The input audio data 211 may include data corresponding to the wakeword; in other embodiments, the portion of the audio corresponding to the wakeword is removed by the user device 110 prior to sending the input audio data 211 to the remote system(s) 120. In the case of touch input detection, for example, the input audio data 211 may not include a wakeword.

The wakeword detector may determine a similarity score for the candidate wakeword based on how similar it is to the stored wakeword; if the similarly score is higher than the wakeword-detection threshold, the wakeword detector determines that the wakeword is present in the audio data, and if the similarity score is less than the wakeword-detection threshold, the wakeword detector determines that the wakeword not is present in the audio data. For example, if the candidate wakeword matches the stored wakeword very closely, the wakeword detector may determine a similarity score of 100; if the candidate wakeword does not match the stored wakeword at all, the wakeword detector may determine a similarity score of 0. If the wakeword detector determines candidate wakeword partially matches the stored wakeword, it may determine an intermediate similarity score, such as 75 or 85. Though the disclosure herein describes a similarity score of 0-100, wherein zero is least similar and 100 is most similar. The present disclosure is not limited to any particular range of values of the similarity score, and any system or method of determining similarity between a candidate wakeword represented in captured audio data and a stored representation of the wakeword is within the scope of the present disclosure.

Upon receipt by the system(s) 120, the input audio data 211a/221b may be sent to an orchestrator component 240. The orchestrator component 240 may include memory and logic that enables it to transmit various pieces and forms of data to various components of the system, as well as perform other operations as described herein. The orchestrator component 240 may send the input audio data 211a/211b to one or more of the speech-processing systems 292, which may be used to determine which, if any, of the ASR 250, NLU 260, and/or TTS 280 components should receive and/or process the audio data 211. In some embodiments, the orchestrator component 240 includes one or more ASR components 250, NLU components 260, TTS components 280, and/or other processing components, and processes the input audio data 211 before sending it and/or other data to one or more speech-processing components 292 for further processing. In other embodiments, the orchestrator component 240 sends the input audio data 211 directly to one or more of the speech-processing components 292 for processing.

A speech-processing system 292 may control, have access to, or otherwise be associated with a set of skills 290, applications, and/or speech styles. The set of skills 290 may include common skills as well as skills exclusive to the speech-processing system 292. The orchestrator component 240 may compare a determined domain, intent, and/or meaning to a list of corresponding applications or skills associated with each speech-processing system 292. The comparison may include determining a number of whole or partial matches of the domain, intent, and/or meaning present in each list. The orchestrator component 240 may determine a score for each speech-processing system 292 corresponding to the ability of each speech-processing system 292 to respond to a command represented in the input audio data 211. If the domain, intent, and/or meaning is determined to be associated with a first speech-processing system 292 but not with a second speech-processing system 292, the orchestrator component 240 may award the first speech-processing system 292 a higher score than the second speech-processing system 292.

In some embodiments, the orchestrator component 240 communicates with the speech-processing systems 292 using an application programming interface (API). The API may be used to send and/or receive data, commands, or other information to and/or from the speech-processing systems 292. For example, the orchestrator 240 may send, via the API, the input audio data 211 to a speech-processing system 292 and may receive, from the selected speech-processing system 292, a command and/or data responsive to the audio data 211.

Each speech-processing system 292 may include an ASR component 250, which may transcribe the input audio data 211 into text data. The text data output by the ASR component 250 may represent one or more than one (e.g., in the form of an N-best list) ASR hypotheses representing speech represented in the input audio data 211. The ASR component 250 interprets the speech in the input audio data 211 based on a similarity between the audio data 211 and pre-established language models. For example, the ASR component 250 may compare the input audio data 211 with models for sounds (e.g., acoustic units such as phonemes, senons, phones, etc.) and sequences of sounds to identify words that match the sequence of sounds of the speech represented in the input audio data 211. The ASR component 250 sends the text data generated thereby to an NLU component 260, via, in some embodiments, the orchestrator component 240. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein.

Each speech-processing system 292 may further include a NLU component 260 that attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the user device 110, the system(s) 120, a skill component 290, a skill system(s), etc.) to execute the intent. For example, if the text data corresponds to "call Mom," the NLU component 260 may determine an intent that the system initiate communications (using, for example, the communication component 296) with a second user device 110*b* corresponding to the entity "Mom." As another example, if the text data corresponds to "what is the weather," the NLU component 260 may determine an intent that the system output weather information associated with a geographic location of the user device 110.

The NLU results data may be sent (via, for example, the orchestrator component 240) from the NLU component 260 (which may include tagged text data, indicators of intent, etc.) to a skill component(s) 290. If the NLU results data includes a single NLU hypothesis, the NLU component 260 may send the NLU results data to the skill component(s) 290 associated with the NLU hypothesis. If the NLU results data includes an N-best list of NLU hypotheses, the NLU component 260 may send the top scoring NLU hypothesis to a skill component(s) 290 associated with the top-scoring NLU hypothesis. As described above, the NLU component 260 and/or skill component 290 may determine, using the interaction score, text data representing an indication of a handoff from one speech-processing system 292 to another.

A skill component 290 may be software running on the system(s) 120 that is akin to a software application. That is, a skill component 290 may enable the system(s) 120 to execute specific functionality in order to provide data or produce some other requested output. The system(s) 120 may be configured with more than one skill component 290. For example, a weather service skill component may enable the system(s) 120 to provide weather information, a communications skill component may enable the system(s) 120 to initiate communications between a first device 110*a* and a second device 110*b*, a restaurant skill component may enable the system(s) 120 to order a pizza with respect to the restaurant's online ordering system, etc. A skill component 290 may operate in conjunction between the system(s) 120 and other devices, such as the user device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

The speech-processing system 292 may further include a TTS component 280 that generates audio data (e.g., synthesized speech) from text data using one or more different methods. Text data input to the TTS component 280 may come from a skill component 290, the orchestrator component 240, and/or another component of the system. The text data may include an indication of a speech-processing component and/or data responsive to a command.

The system(s) 120 may include a user-recognition component 295 that recognizes one or more users associated with data input to the system. The user-recognition component 295 may take as input the audio data 211 and/or text data output by the ASR component 250. The user-recognition component 295 may perform user recognition by comparing audio characteristics in the input audio data 211 to stored audio characteristics of users. The user-recognition component 295 may also perform user recognition by comparing biometric data (e.g., fingerprint data, iris data, etc.), received by the system in correlation with the present user input, to stored biometric data of users. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system.

The remote system(s) 120 may further include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier. Each user profile may include various user identifying information. Each user profile may also include preferences of the user and/or one or more device identifiers, representing one or more devices of the user. When a user logs into to an application installed on a user device 110, the user profile (associated with the presented login information) may be updated to include information about the user device 110. As described, the profile storage 270 may further include data that shows an interaction history of a user, including commands and times of receipt of commands. The profile storage 270 may further include data that shows when a second user was present to hear an indication of a handoff for a command uttered by a first user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system may be configured to incorporate user permissions and may only perform activities disclosed herein if approved by a user. As described above, these permissions may include a grant (or denial) to use a particular speech-processing system 292. The systems, devices, components, and techniques described herein may thus be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIGS. 3A, 3B, and 3C illustrate systems for audio processing that includes a noise-reduction component 222 according to embodiments of the present disclosure. For clarity, single instances of each component of the system may be illustrated; one of skill in the art will understand, however, that the system may include multiple instances of each component in accordance with each microphone 301, each frequency bin, and/or each item of reference data 312 (as described in greater detail below). In some embodiments, the system includes eight microphones 301 and 128 frequency bins. An overview of the system is first presented in the below paragraphs; each component is then described in greater detail.

In various embodiments, with reference first to FIG. 3A, one or more microphone(s) 301 receive(s) audio corresponding to the environment of the device 110 and transduces the audio into microphone data 302. An analysis filterbank 304 converts the audio data 302 into frequency-domain audio data and may further separate the frequency-domain audio data into two or more frequency ranges or "bins." An acoustic-echo cancellation component 306 may be used to remove reference audio data 312 from the frequency-domain audio data; this reference audio data 312 may be received from an audio data source 314, such as a far-end participant on a voice or video call. The far-end audio data 316 may be output using a loudspeaker 320; the microphone data 302 may include at least a portion of a representation of the far-end audio data 316.

A single microphone 301 may capture audio and determine corresponding audio data representing the utterance 104 and/or noise 108 for further processing by other components of FIGS. 3A, 3B, and/or 3C. In other embodiments, one or more microphones 301 may each determine corresponding audio data for further processing by other components of FIGS. 3A, 3B, and/or 3C. Audio data determined by one of the one or more microphones 301 may be selected for further processing based on one or more properties of the audio data, such as its signal-to-noise ratio; the audio data having the highest signal-to-noise ratio may, for example, be selected for further processing. In other embodiments, audio data corresponding to two or more microphones may be combined (by, for example, averaging or adding corresponding values of the audio data) before further processing. In still other embodiments, audio data from two or more microphones 301 may be processed by the analysis filterbank 304 (and/or other components).

In other embodiments, the analysis filterbank 304 (and/or other components of FIGS. 3A, 3B, and/or 3C) may process audio data received from audio sources other than the microphone 301. An example audio source may be computer source of a device 110 and/or system 120 that includes stored audio data representing an utterance and/or noise. The stored audio data may be, for example, a voice message and/or a voice memo. The stored audio data may further correspond to media such as a podcast and/or radio program.

The analysis filterbank 304 may perform a Fourier transform, such as a fast Fourier transform (FFT), and may include one or more uniform discrete Fourier transform (DFT) filterbanks, which convert the time-domain audio data 302 into the frequency-domain audio data. The frequency-domain audio data may be a spectrogram, which may be a two-dimensional matrix of numbers in which one dimension of the matrix corresponds to the number of frequency bins (e.g., 128) and in which a second dimension of the matrix corresponds to a number of audio frames. The spectrogram data may be divided into magnitude spectrogram data and phase spectrogram data. An audio frame may refer to a portion of the microphone data 302 captured over a period of time (for example, 8-10 milliseconds). A value of a frequency for a particular frequency bin for a given frame may be the average frequency determined during that period of time. The frequency-domain audio data may further be processed to determine magnitude audio data representing a magnitude of a signal for a particular frequency bin and frame and phase audio data for a particular frequency bin and frame.

The frequency-domain audio data may include a plurality of audio signals Yin each of a plurality of sub-band domains. If multiple microphones 301 are used, the audio signals Y may incorporate audio signals corresponding to multiple different microphones 301 as well as different sub-bands (i.e., frequency ranges) as well as different frame indices (i.e., time ranges). Thus, the microphone data 301 from the mth microphone 301 may be represented as $X_m(k,n)$, where k denotes the sub-band index, and n denotes the frame index. The combination of all audio signals for all m microphones 301 for a particular sub-band index frame index may be represented as X(k,n).

The acoustic-echo cancellation component 306 may subtract reference audio data 312 from the frequency-domain audio data using, for example, hardware and/or software configured to subtract data representing a first signal from data representing a second signal. The acoustic-echo cancellation component 306 may include an adaptive filter, such as a finite impulse-response (FIR) filter, that is configured to minimize an error signal between an output of the filter and the near-end audio. Multiple acoustic echo cancellers 306 may be used for each microphone 301 and/or for each frequency bin. Multiple acoustic echo cancellers 306 may further be used for multiple items of reference audio data 312, such as left-and-right stereo reference signals.

The user device 110 may perform a number of other audio functions, such as automatic gain control (AGC), filtering (high-, low-, and/or band-pass filtering), echo suppression, and/or beamforming. Beamforming refers to techniques that are used to isolate audio from one or more particular directions. Beamforming may be used to filter noise from a noise source disposed in a direction different from that of an intended audio source. A fixed beamformer component may isolate audio from particular directions by applying one or more filters, each having different filter coefficients, to exploit variations in the time each microphone in a microphone array receives audio from each direction. An adaptive beamformer may remove noise by identifying a direction in which a noise source lies and removing that noise from desired audio. A beam-selection component may select at least one beam from a plurality of beams corresponding to a desired direction, such as a direction toward which a user is disposed.

A beamformer/beam selector component may process the output(s) of the acoustic-echo cancellation component 306 (and/or other outputs) to determine one or more audio data beams each corresponding to a different direction relative to the device 110. One beam may correspond to a first direction in which the user 102 is disposed, while a second beam may correspond to a second direction in which the noise source 106 is disposed. In various embodiments, the noise-reduction component 222 (and/or other noise-reduction component) may subtract audio data corresponding to the second beam from audio data corresponding to the first beam to thereby reduce noise from the first beam.

Beamforming may be performed by determining filter coefficient values (e.g., Finite Impulse Response (FIR) filter coefficient values) for each beam direction (e.g., look direction, direction of interest, etc.) based on a position of physical microphones 301. For example, a first position of a first physical microphone 301 may correspond to a first filter coefficient associated with a first direction and a second position of a second physical microphone 301 may correspond to a second filter coefficient associated with the first direction. Thus, to generate beamformed audio data in the first direction, the beamformer may apply the first filter coefficient value to first audio data captured by the first physical microphone and apply the second filter coefficient value to second audio data captured by the second physical microphone.

The filter coefficient values may be determined using minimum variance distortionless response (MVDR) beamformer techniques, Linearly Constrained Minimum Variance (LCMV) beamformer techniques, and/or generalized eigenvalue (GEV) beamformer techniques, although the disclosure is not limited thereto and the filter coefficient values may be determined using any technique known to one of skill in the art without departing from the disclosure.

The noise-reduction component 222 may include a model trained to reduce noise represented in the microphone data 402. This model, as described herein, may include one or more deep neural networks (DNNs) and one or more recurrent neural networks (RNNs). The model may be a causal model, meaning that it may process microphone data 302 as it is received from the microphone 301 and produce corresponding outputs. The model may further include one or more dense layers and one or more skip connections. The noise-reduction component 222 is described in greater detail below with reference to FIGS. 4, 5A, 5B, 6A, 6B, 7A, and 7B.

A synthesis filterbank 310 may be used to convert the frequency-domain data back to time-domain output audio data 316 using, for example, an inverse Fourier transform (such as an Inverse Fast Fourier Transform (IFFT). This conversion may include combining magnitude data and phase data. The output audio data 316 may then be used for further audio processing, such as speech processing.

With reference to FIG. 3B, the noise-reduction component 222 may process the microphone data 302 prior to processing by, for example, the acoustic echo canceller 306. In some embodiments, prior to processing by the noise-reduction component, the sampling rate microphone data 302 is changed to either increase or decrease the sampling rate. After processing by the noise-reduction component, the sampling rate of the output thereof may be similarly changed to either decrease or increase the sampling rate such that the sampling rate of the output is the same as the sampling rate of the microphone data 302.

With reference to FIG. 3C, the noise-reduction component 222 may process the output(s) of the acoustic echo canceller 306 prior to processing by, for example, the synthesis filterbank 310. Similarly, (not shown), the noise-reduction component 222 may process the output(s) of the analysis filterbank 304 prior to processing by, for example, the acoustic echo canceller 306. In either of these embodiments, the noise-reduction component 222 may thus process audio data corresponding to one or more frequency bin(s) of audio data.

Figure 4B:
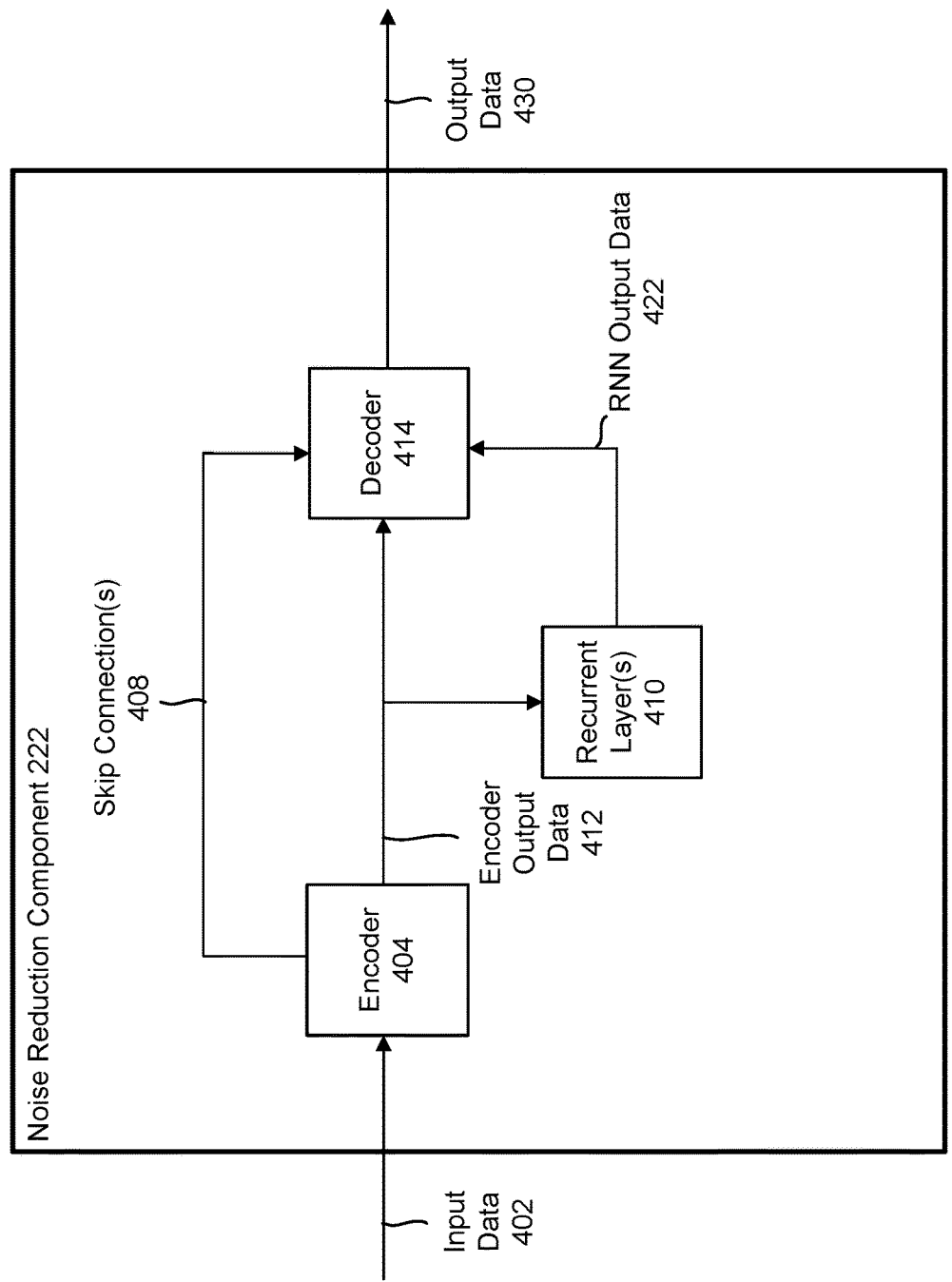

FIGS. 4A and 4B illustrates a noise-reduction component 222 of a user device according to embodiments of the present disclosure. Referring first to FIG. 4A, the noise-reduction component 222 may include an encoder 404 for processing input data 402 to determine encoder output data 412, which may be the first encoded data. The input data 402 may be the output of the microphone 301 or the output of the synthesis filterbank 310. The input data may instead or in addition be the audio data 211 transmitted from the user device 110 to the remote system 120. The noise-reduction component 222 may further include one or more recurrent layer(s) 410 for processing the encoder output data 412 to determine RNN output data 422, which may be the second encoded data. The noise-reduction component 222 may further include a decoder 414 for processing the encoder output data 412 and the RNN output data 422 to produce mask data 424. A delay component 418 may process the input data 402 to determine delayed input data 428 to account for a latency of the encoder 404 and the decoder 414.

A complex multiplication component 426 may process the mask data 424 and the delayed input data 428 to determine the output data 430. The mask data 424 may be a vector and/or series of vectors comprising complex numbers of the form a +bi, wherein a denotes the real part of each number and wherein b denotes the imaginary part of each number. Similarly, the input data 402 and delayed input data 428 may also be a vector and/or series of vectors comprising complex numbers of the form c+di, wherein c denotes the real part of each number and wherein d denotes the imaginary part of each number. The complex multiplication component 426 may thus, for each complex number of the mask data 424 and each corresponding complex number of the delayed input data 428, perform the complex multiplication (a+bi)×(c+di) to determine the output data 430.

The device 110 may send the output data 420 to a different component and/or device, such as the user device 110b, remote system 120, and/or the wakeword-detection component, for further processing. The further processing by the remote system 120 may include ASR/NLU processing; the further processing by the other device 110b may include output thereon (e.g., as part of audio communication). The noise-reduction component 222 may further include one or more skip connections 408 that provide one or more outputs of the encoder 404 directly to the decoder 414. Details of each of these components is described in greater detail below.

The encoder output data 412 may be a vector of N floating-point numbers; N may be, for example, 1024. The numbers of the encoder output data 412 may collectively uniquely identify one or more items of input data 402. That is, for first input data 402 corresponding to a first utterance 104 and/or first noise 108, the encoder 404 may determine first corresponding encoder output data 412. For second input data 402 corresponding to a second utterance 104 and/or second noise 108 different from the first utterance 104 and/or first noise 108, the encoder 404 may determine second corresponding encoder output data 412 different from the first corresponding encoder output data 412.

A vector represented by the encoder output data 412 may thus be regarded as a point in an N-dimensional embedding space; the N-dimensional embedding space spans a number of possible utterances (by various speakers) and possible noise. When a particular utterance and/or noise is represented in the input data 402, the encoder 404 determines corresponding encoder output data 412, which represents the point in the embedding space corresponding to that particular utterance and/or noise. As mentioned above, the encoder 404 may be trained using training data; during training, the encoder 404 may define the embedding space automatically (an "autoencoder") as values of the noise-reduction component 222 are updated to match target values corresponding to the training data.

As mentioned above, the input data 402 may be organized in frames, and the encoder 404 may thus process successive frames of input data 402. Each frame may correspond to a time period of received audio; this time period may be, for example, 10 milliseconds. The encoder may process overlapping frames of input data 402; for example, the encoder 404 may process a 10 millisecond frame every 1 millisecond. In this example, a second-processed frame overlaps a first-processed frame by 9 milliseconds. Any size frame and any amount of overlap is, however, within the scope of the present disclosure.

As described herein, the encoder 404 may include a number of neural-network layers, such as a number of DNN layers. A first layer may thus process a frame of input data 402 while a second layer processes an output of the first layer, and so on. The encoder output data 412 may thus depend on a number of frames of input data corresponding to a number of layers of the encoder 404. This number of frames and layers may be, for example, between 2 and 50. The number of layers and frames may correspond to a duration of time it takes to speak an average word; for example, 500 milliseconds.

The one or more recurrent layer(s) 410 process the encoder output data 412 output by the encoder 404 to determine the RNN output data 422, which may be the second encoded data. In some embodiments, the recurrent layer(s) 410 include two layers of RNN cells, such as an LSTM cell; the recurrent layer(s) 410 may include other types of RNN cells, such as GRU cells. In some embodiments, the dimension of the encoder output data 412 is the same as the dimension of the RNN output data 422; this dimension may be, for example, 128. In other words, the recurrent layer(s) 410 may include 256 RNN cells arranged in two layers. Cells in the first layer may be fully or partially connected to cells in the second layer.

In some embodiments, as explained in greater detail below, the decoder 414 includes a number of dense layers 604 that receive the RNN output data 422. The recurrent layers 410 may include a first fully connected layer that determines outputs for a first dense layer 604a, a second fully connected layer that determines outputs for a second dense layer 604b, and so on.

Each cell in the recurrent layer(s) 410 may include a recurrent connection from itself and/or from another cell. Each cell may thus receive two inputs: a first input comprising or derived from the incoming encoder output data 412 and a second recurrent input derived from previously received encoder output data 412. The two inputs may be weighted so that the output of the cell depends on a certain percentage of the first input and a different percentage of the second input. For example, the cell may weight the first input by 0.75 and weight the second input by 0.25 (e.g., 1—the first weight), meaning that the output of the cell depends 75% on the first input and 25% on the second input. In this way, the cell may "remember" a certain amount of information from previously received encoder output data 412 while still processing newly arrived encoder output data 412.

The decoder 414 processes encoder output data 412, the skip connections 408, and the RNN output data 422 determined by the recurrent layer(s) 410 to determine mask data 424. In some embodiments, a 1×1 convolution component 416 processes decoder output data 420 determined by the decoder 414 to determine the mask data 424. Like the encoder 404, the decoder 414 may include a number of neural-network layers, such as a number of DNN layers, and may similarly be a causal network. A first layer may process a first item of encoder output data 412, a first item of RNN output data 422, and/or one or more skip connections 408, while a second layer processes an output of the first layer, and so on. The mask data 424 may thus depend on a number of items of RNN output data 422 corresponding to a number of layers of the decoder 414.

Similar to how the encoder 404 is trained to map one or more frames of input data 402 representing an utterance and noise to a point in the embedding space determined during training, the decoder 414 may be trained to decode a determined point in the embedding space to mask data 424 corresponding to the reduced noise. For example, a given item of training data may include input training data, such as audio representing "What is the wea<honk>ther?" (wherein the <honk> is a car horn), and target training data, such as audio representing "What is the weather?". The encoder 404 and/or recurrent layer(s) 410 may be trained to map the input training data to a particular N-vector as represented by the encoder output data 412. The decoder 414 may similarly be trained such that, when that particular N-vector appears in the encoder output data 412, the decoder 414 outputs mask data 424 that represents a mask corresponding to the noise. When the input data 402 represents a similar utterance and noise, the encoder 404 and/or recurrent layer(s) 410 determine a similar N-vector, and the decoder 414 outputs similar mask data 424.

As mentioned above, one or more skip connection(s) 408 may directly connect outputs of the encoder 404 with inputs of the decoder 414. As discussed below with reference to FIGS. 7A and 7B, the encoder 404 and/or decoder 414 may include one or more dense layers, in which a given layer of the encoder 404 and/or decoder 414 is not just connected to a preceding layer, but also to at least one other preceding layer. Because these extra connections may make the training process more complicated (e.g., make the gradient descent algorithm more difficult to compute), the one or more skip connection(s) 408 may be added to ease the training process. In other words, as updated network values, such as weights and offsets, are back-propagated throughout the noise-reduction component 222, the skip connection(s) 408 may provide a more direct path from the decoder 414 to the encoder 404, thus allowing more direct computation of the updated values of the encoder 404.

The input data 402 and/or mask data 424 may, as described herein, be divided into complex data such as magnitude data and phase data. The input data 402 and/or mask data 424 may, instead or in addition, be divided into other complex data such as real data and imaginary data; the present disclosure is not limited to any particular representation of the data. The real and imaginary data may correspond to (x,y) coordinates on the complex plane; the magnitude data may correspond to the vector defined by the (x,y) coordinates, while the phase data may correspond to the angle that the vector makes with the x-axis. The real and imaginary data may similarly be determined from the magnitude and phase data by determining the (x,y) coordinates defined by the vector and angle.

The noise-reduction component 222 may thus be trained (e.g., have updated values for weights and/or offsets determined by a gradient descent function) by minimizing the loss function using, for example, a mean square error (MSE) function applied to the output data 430. In other words, a gradient is determined that reduces the magnitude of the loss function, and the gradient is descended in accordance with a step size to determine new values for the weights and/or offsets. The values of the mask data 424 may thus not be determined directly but instead determined by applying the loss function to the output data 430 and back-propagating updated values.

The output data 430 may represent a version of the input data 402 that represents the utterance 104 and a reduced version of the noise 108. As described above, the output audio data 430 may be time-domain data that includes a representation of the utterance, and may be sent to another device 110 and/or system 120 for further processing, such as wakeword and/or ASR processing.

Referring to FIG. 4B, in some embodiments, the decoder 414 may produce the output data 430 directly (in lieu of, for example, determining decoder output data 420 for processing by the 1×1 convolution component 416 and/or complex multiply component 426. In other words, the decoder 414 may be trained to directly produce audio output data, such as spectrogram data.

FIGS. 5A and 5B illustrate encoders 404a, 404b of a user device 110 according to embodiments of the present disclosure. Referring first to FIG. 5A, as mentioned above, an encoder 404a may include any number of layers, such as N layers. In some embodiments, the encoder 404a includes a number of pairs of layers; a number of dense layer(s) 502 and a number of downsample layer(s) 504. A first dense layer 502a may receive and process input data 402 (or other input data, such as data output by another layer), and a first downsample layer 504a may process the output of the first dense layer 502a. A second dense layer 502b may receive and process the output of the first downsample layer 504a, and so on. A final dense layer 502n may determine the encoder output data 412. As mentioned above, the dense layers 502 may output one or more skip connections 408. Each skip connection 408 may be an output of a dense layer 502 that is received by both a next downsample layer 504 and the decoder 414. In various embodiments, the skip connections 408 output by a given dense layer 502 comprise half of the outputs of the dense layer 502. The skip connections 408 may correspond to, for example, every other output of the dense layer 502.

Each dense layer 502 may perform an A×B two-dimensional convolution, wherein A and B are any integers and A corresponds to a number of frames of input data and B corresponds to a number of frequency bins. In some embodiments, A=1 and B=3; the present disclosure is not, however, limited any particular values of A and B. The dense layer 502 may further feature a growth rate G that defines a number of outputs produced for a given input. These outputs may be collectively referred to as a feature map. In some embodiments, G=32.

Each downsample layer 504 may perform a downsampling function, such as a N×N two-dimensional convolution having a stride greater than 1, to decrease the sampling rate of its input and may produce H feature maps. In some embodiments, N=3, and H=32, but the present disclosure is not limited to any particular values for N and H, and they may be any integers. Referring to FIG. 5B, the encoder 404a may include five dense layers 502a, 502b, 502c, 502d, and 502e, and four downsample layers 504a, 504b, 504c, and 504d.

In some embodiments, the dense layer 502 and/or downsample layer 504 may include other types of layers, such as a pooling layer or fully connected layer. A pooling layer may reduce the dimensionality of input data by downsampling; a max-pooling layer, for example, determines a maximum value of an N×M matrix of input data and replaces the matrix with that single value in its output data. A fully connected layer is a layer in which each node of the layer is fully connected to each node in preceding and following layers, and may improve convergence in training.

Figure 6A:
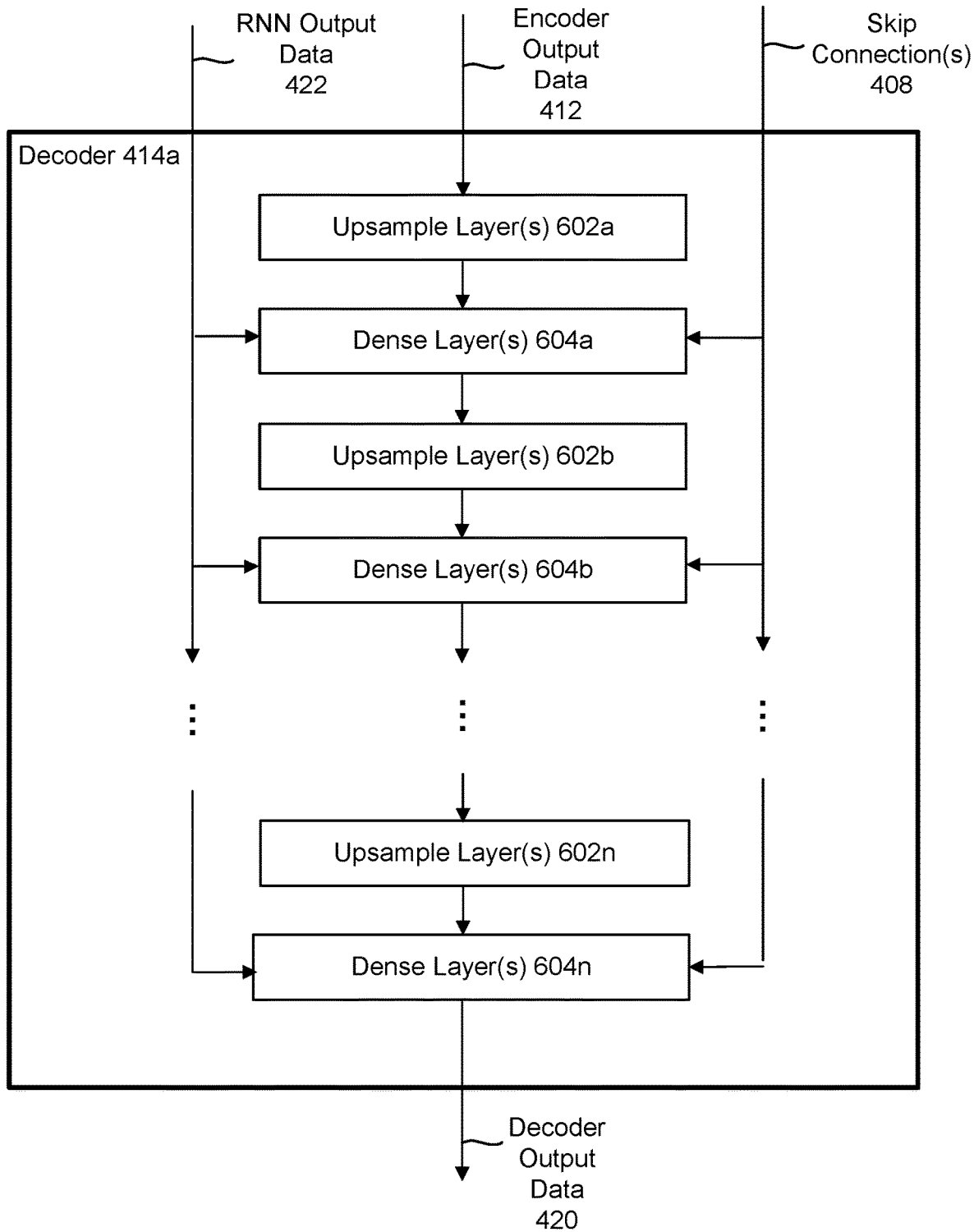
FIGS. 6A and 6B illustrate decoders of a noise-reduction component according to embodiments of the present disclosure.
Figure 6B:
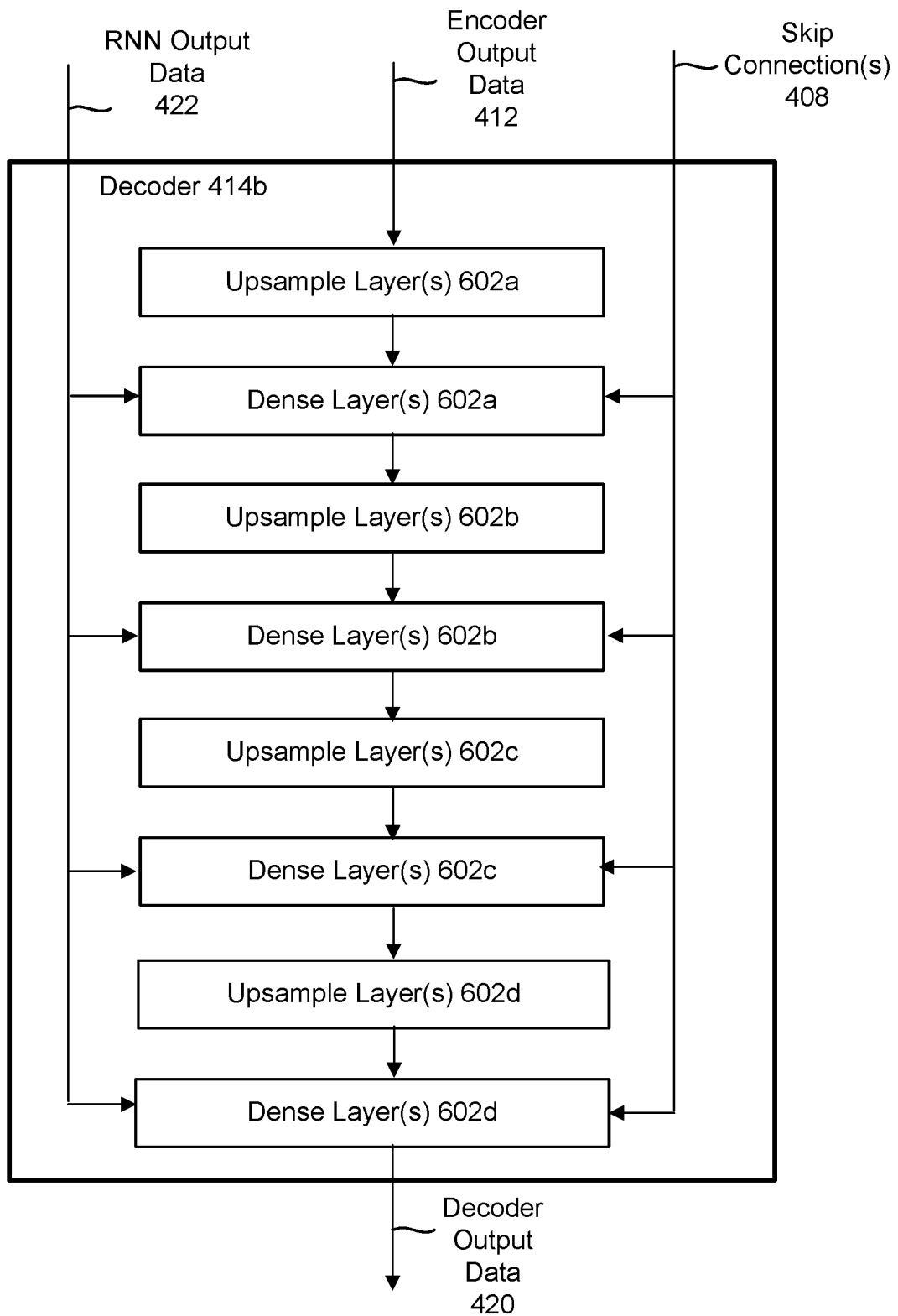

FIGS. 6A and 6B illustrate decoders of a user device 110 according to embodiments of the present disclosure. Referring first to FIG. 6A, like the encoder 404a of FIG. 6A, the decoder 414a may include any number of layers, such as N layers. In some embodiments, the decoder 414a also includes a number of pairs of layers; a number of upsample layers 602 and a number of dense layer(s) 604. A first upsample layer 602a may receive and process the encoder output data 412 (or other input data, such as data output by another layer), and a first dense layer 604a may process the output of the first upsample layer 602a, the RNN output data 422, and the skip connections 408. A second upsample layer 602b may receive and process the output of the first dense layer 604a, and so on. A final dense layer 604n may determine the decoder output data 420. As mentioned above, the dense layers 704 may input one or more skip connections 408. Each skip connection 408 may be an output of a dense layer 502 of the encoder 404. In various embodiments, the skip connections 408 input by a given dense layer 604 comprise one third of the inputs of the dense layer 604, while the RNN output data 422 and the encoder output data 412 correspond to other thirds. The skip connections 408 may correspond to, for example, every third input of the dense layer 604.

Each upsample layer 602 may perform an upsampling function, such as an unpooling and/or transpose convolution function, to increase the sampling rate of its input data. Each dense layer 604 may perform a transpose A×B two-dimensional convolution, wherein A and B are any integers and A corresponds to a number of frames of input data and B corresponds to a number of frequency bins. In some embodiments, A=1 and B=3; the present disclosure is not, however, limited any particular values of A and B. The dense layer 604 may further feature a growth rate G that defines a number of outputs produced for a given input. These outputs may be collectively referred to as a feature map. In some embodiments, G=32. Referring to FIG. 6B, the decoder 414b may include four upsample layers 602a, 602b, 602c, and 602d, and four dense layers 604a, 604b, 604c, and 604d.

Figure 7A:
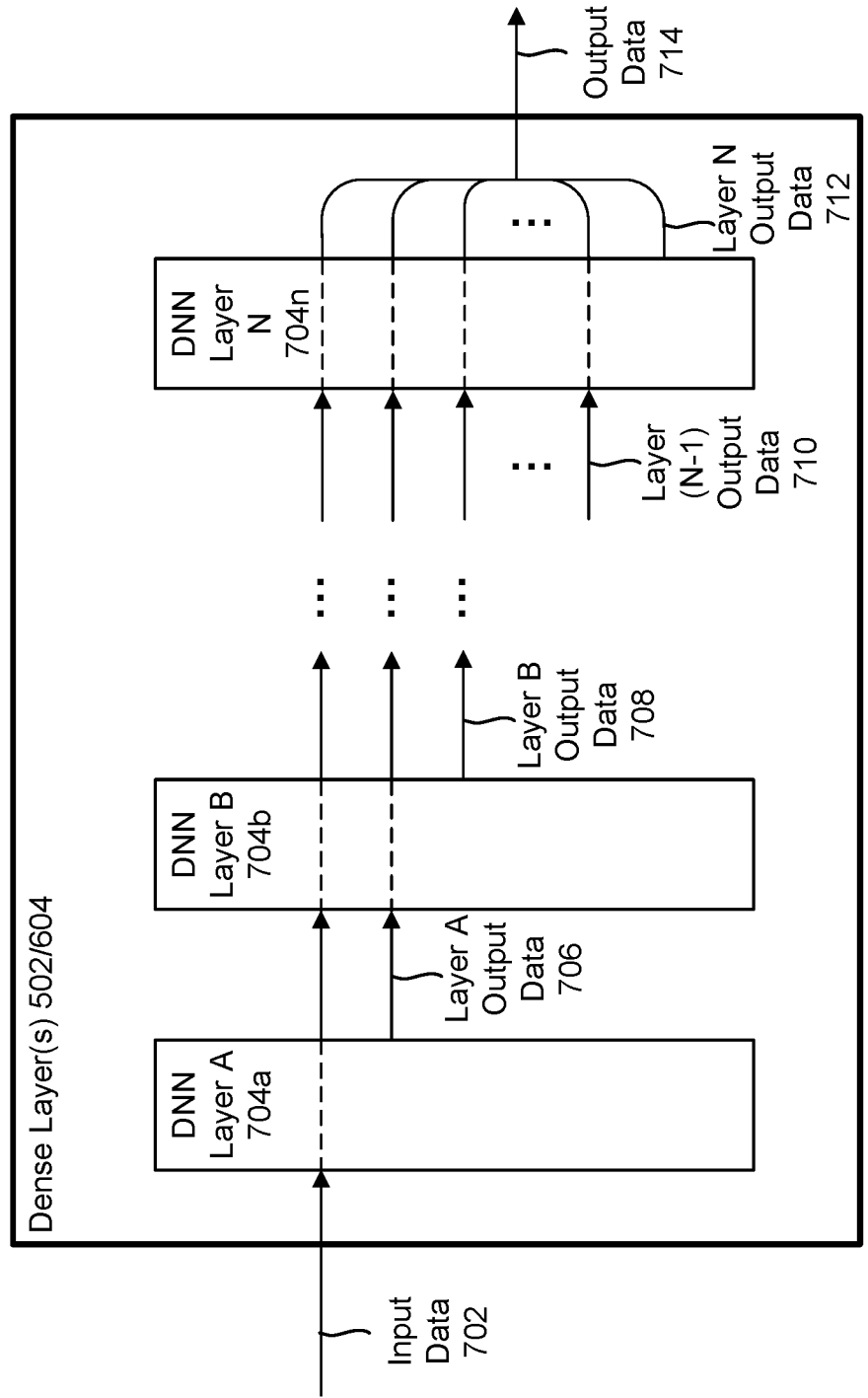
FIGS. 7A and 7B illustrate dense layers of a noise-reduction component according to embodiments of the present disclosure.
Figure 7B:
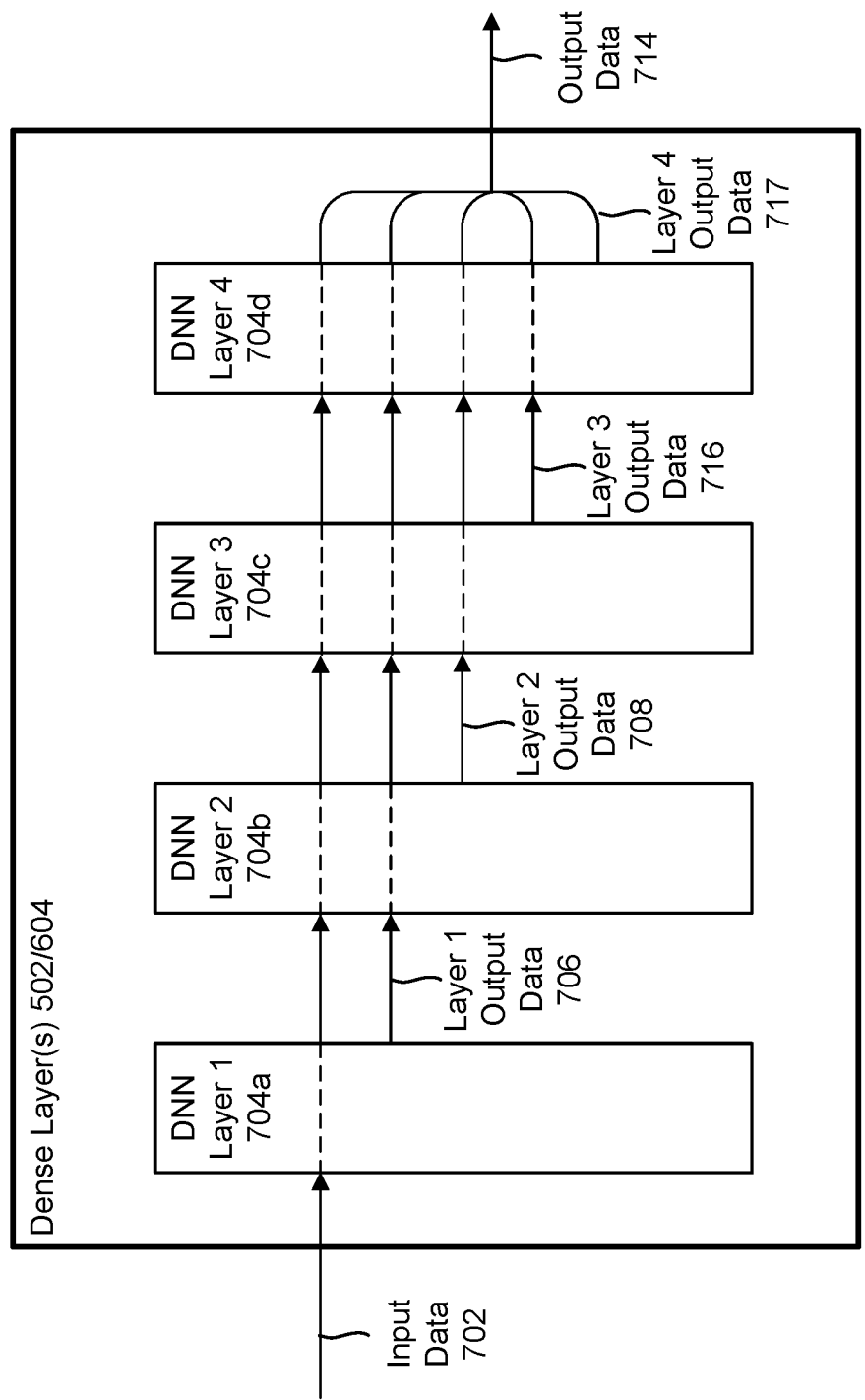

FIGS. 7A and 7B illustrate dense layers 502/604 of a user device 110 according to embodiments of the present disclosure. Referring first to FIG. 8A, as explained above, a given layer 704 of the dense layer(s) 502/604 may receive inputs from not just a preceding layer but two or more preceding layers (and/or from input data 702). In some embodiments, each layer 704 receives inputs from every preceding layer and from the input data 702. As shown in FIG. 8A, each layer 704, such as a first layer 704a (which may be a DNN and/or CNN layer), receives the input data 702. A second layer 704b receives the input data 702 as well as the output of the first layer 704a, and so on. Thus, each successive layer of the dense layer 502/604 may receive and output twice as much data as its preceding layer. This doubling of the output may be achieved by increasing the dimensionality of successive layers 704 (e.g., adding nodes) and/or by outputting more data over time.

Referring to FIG. 7B, in some embodiments, the dense layers 502/604 include four DNN/CNN layers 704, each of which is fully connected to each proceeding layer and to the input data 702. For example, a last layer 704d receives the input data 702, layer 1 output data 706, layer 2 output data 708, and layer 3 output data 716 to produce layer 4 output data 717. The output data 714 includes representations of these items of output data. The present disclosure is not, however, limited to only fully connected dense blocks 502/604, and any subset of connections is within the scope of the present disclosure.

FIG. 8 is a block diagram of some components of the user device 110 such as network interfaces 819, sensors 824, and output devices. The components illustrated here are provided by way of example and not necessarily as a limitation. For example, the user device 110 may utilize a subset of the particular network interfaces 819, output devices, or sensors 824 depicted here, or may utilize components not pictured. One or more of the sensors 824, output devices, or a combination thereof may be included on a moveable component that may be panned, tilted, rotated, or any combination thereof with respect to a chassis of the user device 110.

Figure 9:
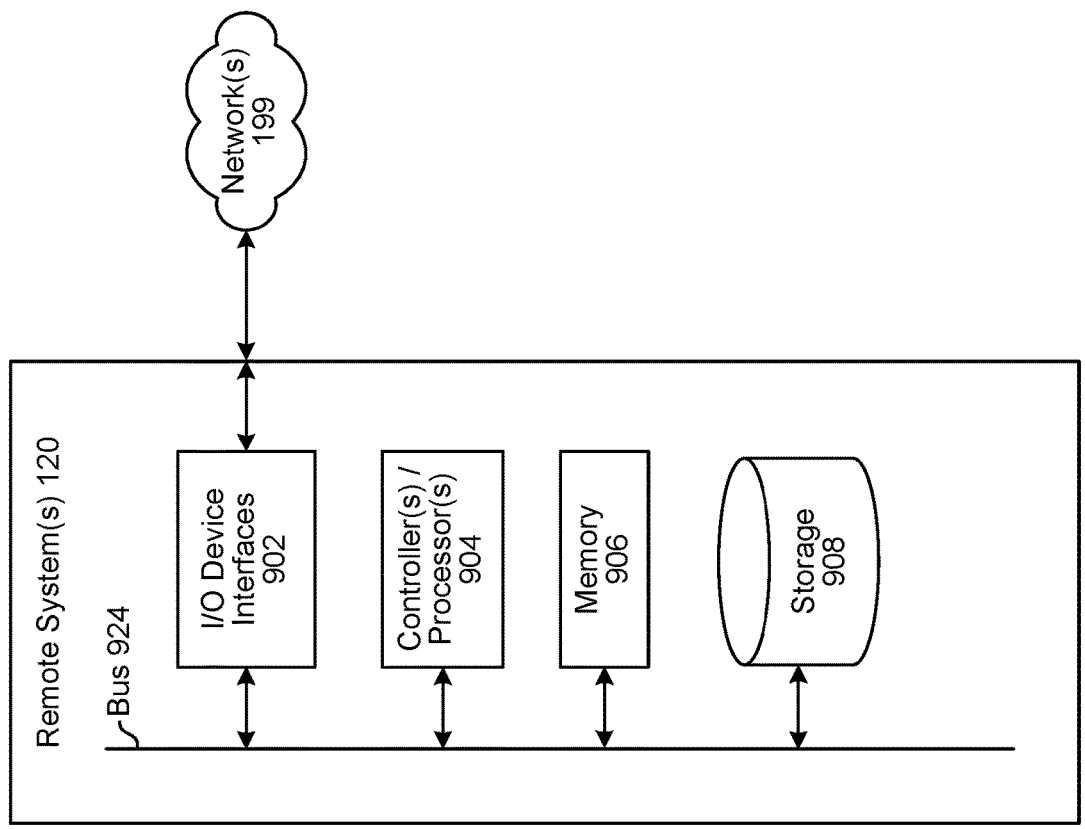
FIG. 9 illustrates a block diagram of a remote system according to embodiments of the present disclosure.

With reference also to FIG. 9, the user device 110 and/or remote system 120 may include input/output device interfaces 802/902 that connect to a variety of components such as an audio output component like a loudspeaker 320, a wired or wireless headset, or other component capable of outputting audio. The user device 110 may also include an audio capture component. The audio capture component may be, for example, a microphone 301 or array of microphones 301, a wired headset or a wireless headset, etc. If an array of microphones is included, approximate distance to a sound's point of origin may be determined by acoustic localization based on time and amplitude differences between sounds captured by different microphones of the array. The user device 110 may additionally include a display 820 for displaying content. The user device 110 may further include a camera 822, light, button, actuator, and/or sensor 824.

The network interfaces 819 may include one or more of a WLAN interface, PAN interface, secondary radio frequency (RF) link interface, or other interface. The WLAN interface may be compliant with at least a portion of the Wi-Fi specification. For example, the WLAN interface may be compliant with at least a portion of the IEEE 802.11 specification as promulgated by the Institute of Electrical and Electronics Engineers (IEEE). The WLAN interface may be compliant with at least a portion of one or more of the Bluetooth, wireless USB, Z-Wave, ZigBee, or other standards. For example, the WLAN interface may be compliant with the Bluetooth Low Energy (BLE) specification.

The WLAN interface may further comprise a radio transmitter and receiver that operate at frequencies different from or using modulation different from the other interfaces. For example, the WLAN interface may utilize frequencies in the 2.4 GHz and 5 GHz Industrial Scientific and Medicine (ISM) bands and/or 2.4 GHz ISM bands. The WLAN interface may comprise a radio transmitter that operates in the 900 MHz ISM band, within a licensed band at another frequency, and so forth.

Other network interfaces may include other equipment to send or receive data using other wavelengths or phenomena. For example, the other network interface may include an ultrasonic transceiver used to send data as ultrasonic sounds, a visible light system that communicates by modulating a visible light source such as a light-emitting diode, and so forth. In another example, the other network interface may comprise a wireless wide area network (WWAN) interface or a wireless cellular data network interface. Continuing the example, the other network interface may be compliant with at least a portion of the 3G, 4G, Long Term Evolution (LTE), 5G, or other standards. The I/O device interface (802/902) may also include and/or communicate with communication components (such as network interface(s) 819) that allow data to be exchanged between devices such as different physical servers in a collection of servers or other components.

The components of the user device(s) 110 and/or the remote system(s) 120 may include their own dedicated processors, memory, and/or storage. Alternatively, one or more of the components of the user device(s) 110 and/or the remote system(s) 120 may utilize the I/O interfaces (802/902), processor(s) (804/904), memory (806/906), and/or storage (808/908) of the user device(s) 110 and/or the remote system(s) 120, respectively. The components may communicate with each other via one or more busses (824/924).

The user device 110 may access one or more servers 120 via the network 199. For example, the user device 110 may use the wakeword detection component to determine if the user is addressing a request to the user device 110. The wakeword detection component may hear a specified word or phrase and transition the user device 110 or portion thereof to the wake operating mode. Once in the wake operating mode, the user device 110 may then transfer at least a portion of the audio spoken by the user to one or more servers 120 for further processing. The servers 120 may process the spoken audio and return to the user device 110 data that may be subsequently used to operate the user device 110.

The user device 110 may also communicate with other devices 110a/110b. The other devices may include one or more devices that are within the physical space such as a home or associated with operation of one or more devices in the physical space. For example, the other devices may include a doorbell camera, a garage door opener, a refrigerator, washing machine, and so forth.

The user device 110 may include one or more batteries (not shown) to provide electrical power suitable for operating the components in the user device 110. In some implementations other devices may be used to provide electrical power to the user device 110. For example, power may be provided by wireless power transfer, capacitors, fuel cells, storage flywheels, and so forth. One or more clocks may provide information indicative of date, time, ticks, and so forth. For example, the processor 804 may use data from the clock to associate a particular time with an action, sensor data, and so forth.

The user device 110 may include one or more hardware processors 804 (processors) configured to execute one or more stored instructions. The processors 804 may comprise one or more cores. The processors 804 may include microcontrollers, systems on a chip, field programmable gate arrays, digital signal processors, graphic processing units, general processing units, and so forth.

The user device 110 may include one or more communication components such as input/output (I/O) interfaces 802, network interfaces 819, and so forth. The communication component(s) may enable the user device 110, or components thereof, to communicate with other devices or components. The I/O interfaces 802 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 802 may couple to one or more I/O devices. The I/O devices may include input devices such as one or more of a sensor 824, keyboard, mouse, scanner, and so forth. The I/O devices may also include output devices such as one or more of a motor, light, speaker 812, display 820, projector, printer, and so forth. In some embodiments, the I/O devices may be physically incorporated with the user device 110 or may be externally placed.

The I/O interface(s) 802 may be configured to provide communications between the user device 110 and other devices such as other devices 110a/110b, docking stations, routers, access points, and so forth, for example through antenna 810 and/or other component(s). The I/O interface(s) 802 may include devices configured to couple to personal area networks (PANs), local area networks (LANs), wireless local area networks (WLANS), wide area networks (WANs), and so forth. For example, the network interfaces 819 may include devices compatible with Ethernet, Wi-Fi, Bluetooth, Bluetooth Low Energy, ZigBee, and so forth. The user device 110 may also include one or more busses 824 or other internal communications hardware or software that allow for the transfer of data between the various modules and components of the user device 110.

FIG. 9 is a block diagram conceptually illustrating example components of the remote system 120, such as a server, which include the noise-reduction component 222 and/or may assist with processing data output by the noise-reduction component 222, such as ASR processing, NLU processing, etc. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers may be included in the remote system 120, such as one or more servers for performing noise reduction, one or more servers for performing ASR processing, one or more servers for performing NLU processing, one or more skill system(s) for performing actions responsive to user inputs, etc. In operation, each of these devices (or groups of devices) may include computer-readable and computer-executable instructions that reside on the respective server.

Figure 10:
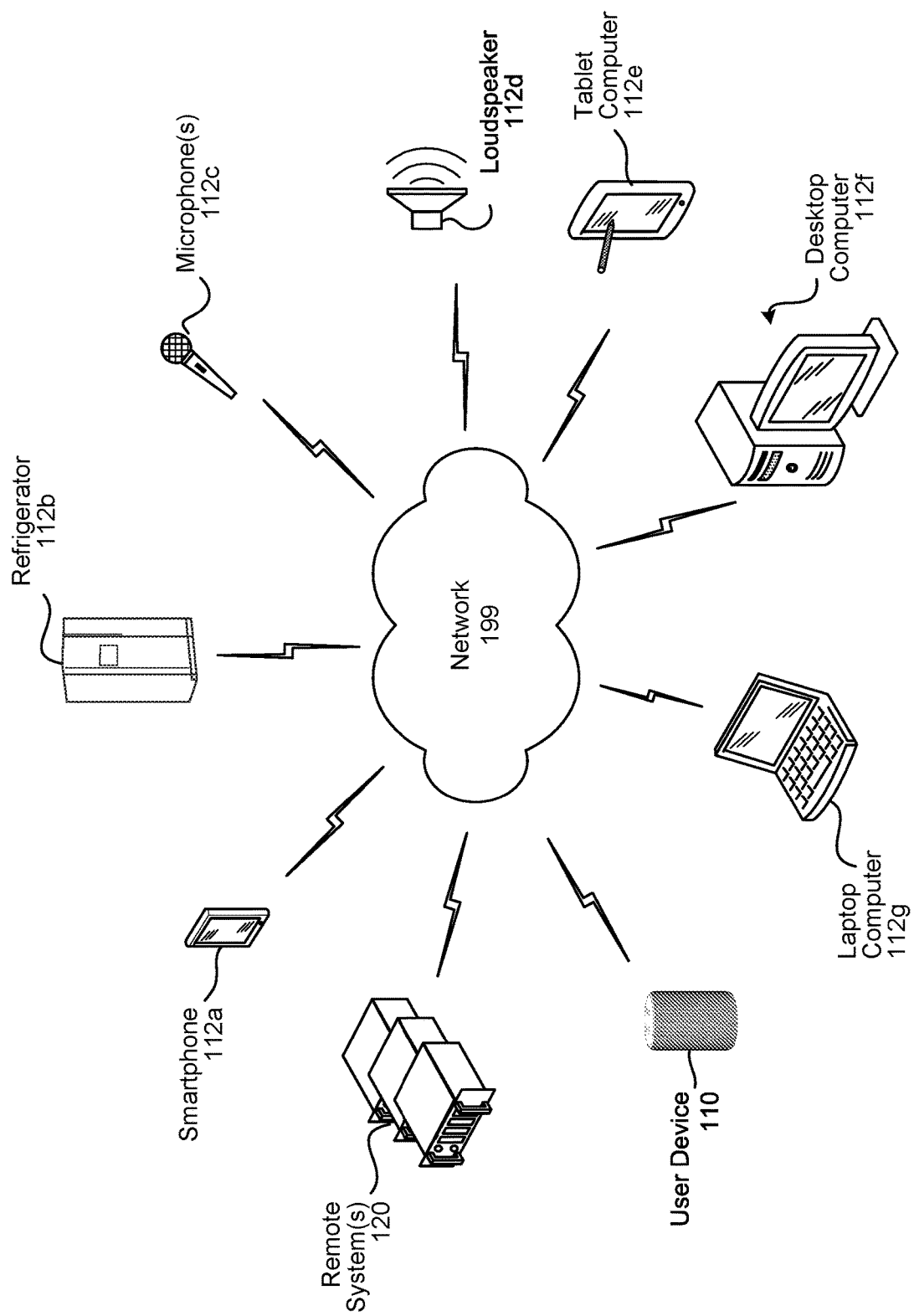
FIG. 10 illustrates a network that includes a computing device according to embodiments of the present disclosure.

As illustrated in FIG. 10 and as discussed herein, the user device 110 may communicate, using the network 199, with the remote system 120 and/or other device(s) 112. The network(s) 199 may include a local or private network or may include a wide network such as the Internet. The other devices may be connected to the network(s) 199 through either wired or wireless connections. Example user devices include a smartphone 112a, a refrigerator 112b, a microphone 112c, a loudspeaker 112d, a tablet computer 112e, a desktop computer 112f, and a laptop computer 112g, which may be connected to the network(s) 199 through a wireless service provider, over a Wi-Fi or cellular network connection, or the like. Other devices are included as network-connected support devices, such as the system(s) 120, the skill system(s), and/or others. The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end, which comprises, among other things, analog and/or digital filters (e.g., filters configured as firmware to a digital signal processor).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising: receiving, from a microphone of a user device, first audio data representing speech and noise;
processing, using a first set of convolutional layers of an encoder, the first audio data to determine first encoder output data corresponding to a first representation of an audio pitch of the noise;
processing, using a second set of convolutional layers of the encoder, the first encoder output data to determine second encoder output data corresponding to a second representation of the audio pitch;
processing, using a recurrent layer, the second encoder output data to determine encoded data representing the audio pitch over a period of time;
processing, using a third set of convolutional layers of a decoder, the first encoder output data, the second encoder output data, and the encoded data to determine mask data representing an amplitude associated with the audio pitch;
and multiplying a first complex number of the first audio data by a corresponding second complex number of the mask data to determine second audio data representing the speech.

2. The computer-implemented method of claim 1, wherein processing the first encoder output data, the second encoder output data, and the encoded data further comprises:
processing, using a first convolutional layer of the third set of convolutional layers, the first encoder output data, the second encoder output data, and the encoded data to determine first output data;
and processing, using a second convolutional layer of the third set of convolutional layers, the first output data, the first encoder output data, the second encoder output data, and the encoded data to determine the mask data.

3. A computer-implemented method comprising: receiving first audio data representing an utterance and noise;
processing, using a first component comprising a first deep neural network (DNN) layer, the first audio data to determine first encoded data corresponding to a first feature of the first audio data;
processing, using a second component comprising a recurrent neural network (RNN) layer, the first encoded data to determine second encoded data corresponding to a second feature of the first audio data;
processing, using a third component comprising a second DNN layer, the first encoded data and the second encoded data to determine mask data corresponding to the noise;
and multiplying a first complex number of the first audio data by a corresponding second complex number of the mask data to determine second audio data representing the utterance.

4. The computer-implemented method of claim 3, further comprising: prior to receiving the first audio data,
receiving, from a microphone, first data representing the utterance and the noise; receiving reference data from an audio data source;
and subtracting the reference data from the first data to determine the first audio data.

5. The computer-implemented method of claim 3, further comprising: after processing the first audio data and the mask data, receiving reference data from an audio data source;
subtracting the reference data from the second audio data to determine third audio data; and sending, to a remote system, the third audio data.

6. The computer-implemented method of claim 3, further comprising:
processing, using a third DNN layer of the first component, first data to determine second data; processing, using a fourth DNN layer of the first component, the second data to determine third data; and
processing, using the first DNN layer, the second data and the third data to determine fourth data, wherein the first encoded data is based at least in part on the fourth data.

7. The computer-implemented method of claim 3, further comprising: determining first magnitude data corresponding to the first audio data;

and determining first phase data corresponding to the first audio data, wherein processing the first audio data comprises processing the first magnitude data and processing the first phase data.

8. The computer-implemented method of claim 3, further comprising: receiving, at the third component from a first layer of the first component, third encoded data;
processing, by a second layer of the first component, the third encoded data to determine fourth encoded data;
receiving, at the third component, the fourth encoded data; receiving, at the third component from the second component, fifth encoded data;
and processing, using the third component, the third encoded data, the fourth encoded data,
and the fifth encoded data to determine second mask data corresponding to second noise.

9. The computer-implemented method of claim 3, wherein:
processing the first audio data comprises sampling the first audio data at a first sampling rate that is lower than a second sampling rate; and processing the first encoded data and the second encoded data comprises sampling the first encoded data and the second encoded data at the second sampling rate.

10. The computer-implemented method of claim 3, further comprising: determining that a remote device includes a fourth component corresponding to the first component; and sending, to the remote device, an indication of processing the first audio data.

11. A device comprising: at least one processor;
and at least one memory including instructions that, when executed by the at least one processor, cause the device to:
receive first audio data representing an utterance and noise;
process, using a first component comprising a first deep neural network (DNN) layer,
first audio data to determine first encoded data corresponding to a first feature of the first audio data;
process, using a second component comprising a recurrent neural network (RNN) layer, the first encoded data to determine second encoded data corresponding to a second feature of the first audio data;
process, using a third component comprising a second DNN layer, the first encoded data and the second encoded data to determine mask data corresponding to the noise; and
process multiply a first complex number of the first audio data by a corresponding second complex number of the mask data to determine second audio data representing the utterance.

12. The device of claim 11, wherein the at least one memory further comprises instructions that, when executed by the at least one processor, further cause the device to: prior to processing the first audio data, receive, from a microphone, first data representing the utterance and the noise; receive reference data from an audio data source; and subtract the reference data from the first audio data to determine the first audio data.

13. The device of claim 11, wherein the at least one memory further comprises instructions that, when executed by the at least one processor, further cause the device to:
after processing the first audio data and the mask data, receive reference data from an audio data source;
subtract the reference data from the second audio data to determine third audio data; and send, to a remote system, the third audio data.

14. The device of claim 11, wherein the at least one memory further comprises instructions that, when executed by the at least one processor, further cause the device to:
process, using a third DNN layer of the first component, first data to determine second data;
process, using a fourth DNN layer of the first component, the second data to determine third data;
and process, using the first DNN layer, the third data and the third data to determine fourth data, wherein the first encoded data is based at least in part on the fourth data.

15. The device of claim 11, wherein the at least one memory further comprises instructions that, when executed by the at least one processor, further cause the device to:
determine first magnitude data corresponding to the first audio data; and
determine first phase data corresponding to a the first audio data,
wherein processing the first audio data comprises processing the first magnitude data and processing the first phase data.

16. The device of claim 11, wherein the at least one memory further comprises instructions that, when executed by the at least one processor, further cause the device to:
receive, at the third component from a first layer of the first component, third encoded data; processing, by a second layer of the first component, the third encoded data to determine fourth encoded data;
receive, at the third component, the fourth encoded data;
receive, at the third component from the second component, fifth encoded data;
and process, using the third component, the third encoded data, the fourth encoded data, and the fifth encoded data to determine second mask data corresponding to second noise.

17. The device of claim 11, wherein the at least one memory further comprises instructions that,
when executed by the at least one processor, further cause the device to: wherein the instructions that cause the device to process the first audio data further comprise instructions that cause the device to sample the first audio data at a first sampling rate that is lower than a second sampling rate;
and wherein the instructions that cause the device to process the first encoded data and the second encoded data further comprise instructions that cause the device to sample the first encoded data and the second encoded data at the second sampling rate.

18. The device of claim 11, wherein the at least one memory further comprises instructions that, when executed by the at least one processor, further cause the device to determine that a remote device includes a fourth component corresponding to the first component;
and send, to the remote device, an indication of processing the first audio data.

* * * * *